(12) United States Patent
Hosokawa et al.

(10) Patent No.: US 12,017,402 B2
(45) Date of Patent: Jun. 25, 2024

(54) METHOD FOR FORMING ANTI-GLARE HARD COAT LAYER

(71) Applicant: NIPPON PAINT AUTOMOTIVE COATINGS CO., LTD., Osaka (JP)

(72) Inventors: Takeki Hosokawa, Hirakata (JP); Yusuke Nakata, Hirakata (JP); Kazuhito Kobayashi, Hirakata (JP)

(73) Assignee: NIPPON PAINT AUTOMOTIVE COATINGS CO., LTD., Osaka (JP)

( * ) Notice: Subject to any disclaimer, the term of this patent is extended or adjusted under 35 U.S.C. 154(b) by 770 days.

(21) Appl. No.: 16/652,117

(22) PCT Filed: Oct. 5, 2018

(86) PCT No.: PCT/JP2018/037463
§ 371 (c)(1),
(2) Date: Mar. 30, 2020

(87) PCT Pub. No.: WO2019/070073
PCT Pub. Date: Apr. 11, 2019

(65) Prior Publication Data
US 2020/0316826 A1 Oct. 8, 2020

(30) Foreign Application Priority Data
Oct. 6, 2017 (JP) ................................. 2017-196277

(51) Int. Cl.
| | | |
|---|---|---|
| *B29C 43/18* | (2006.01) | |
| *B29C 43/02* | (2006.01) | |
| *B29C 59/00* | (2006.01) | |
| *B29C 59/02* | (2006.01) | |
| *B32B 27/08* | (2006.01) | |
| *B32B 27/32* | (2006.01) | |
| *B32B 27/36* | (2006.01) | |
| *B32B 37/10* | (2006.01) | |
| *B32B 37/18* | (2006.01) | |
| *B32B 38/10* | (2006.01) | |
| *C08F 220/06* | (2006.01) | |
| *C09D 133/08* | (2006.01) | |
| *G02B 1/14* | (2015.01) | |
| *G02B 5/02* | (2006.01) | |
| *B29K 75/00* | (2006.01) | |
| *B29K 633/04* | (2006.01) | |
| *B29L 31/34* | (2006.01) | |

(52) U.S. Cl.
CPC .......... *B29C 59/026* (2013.01); *B29C 59/005* (2013.01); *B32B 27/08* (2013.01); *B32B 27/32* (2013.01); *B32B 27/365* (2013.01); *B32B 37/10* (2013.01); *B32B 37/182* (2013.01); *B32B 38/10* (2013.01); *C08F 220/06* (2013.01); *C09D 133/08* (2013.01); *G02B 1/14* (2015.01); *G02B 5/0221* (2013.01); *B29C 59/022* (2013.01); *B29K 2075/00* (2013.01); *B29K 2633/12* (2013.01); *B29K 2833/08* (2013.01); *B29K 2995/0031* (2013.01); *B29K 2995/0098* (2013.01); *B29L 2031/3475* (2013.01); *B32B 2250/40* (2013.01); *B32B 2255/10* (2013.01); *B32B 2255/26* (2013.01); *B32B 2255/28* (2013.01); *B32B 2307/418* (2013.01); *B32B 2307/582* (2013.01); *B32B 2309/12* (2013.01); *B32B 2333/08* (2013.01); *B32B 2333/12* (2013.01); *B32B 2457/208* (2013.01)

(58) Field of Classification Search
CPC .. C08F 90/043; C08F 265/06; C08F 220/286; C08F 222/1006; C08F 222/105; C08F 220/1811; C08F 290/062; C08F 220/06; C08F 220/14; C08F 220/325; C08F 222/106; C08F 222/1065; G02B 1/11; G02B 1/14
See application file for complete search history.

(56) References Cited

U.S. PATENT DOCUMENTS

| | | | | |
|---|---|---|---|---|
| 9,062,142 B2* | 6/2015 | Takihara | ............. | C08F 290/046 |
| 2009/0136713 A1* | 5/2009 | Murata | ................ | G02B 5/0278 |
| | | | | 428/147 |
| 2009/0216035 A1* | 8/2009 | Itami | ...................... | C08G 77/46 |
| | | | | 556/431 |
| 2011/0008577 A1* | 1/2011 | Miyake | .................. | G03H 1/028 |
| | | | | 264/494 |
| 2011/0094402 A1 | 4/2011 | Tokue | | |
| 2015/0028325 A1* | 1/2015 | Seki | ...................... | B29C 59/022 |
| | | | | 264/293 |

(Continued)

FOREIGN PATENT DOCUMENTS

| | | |
|---|---|---|
| EP | 3 437 858 | 2/2019 |
| EP | 3 525 016 | 8/2019 |

(Continued)

OTHER PUBLICATIONS

Wikipedia. Acryl. Jun. 14, 2023. https://simple.wikipedia.org/w/index.php?title=Acryl&oldid=8676702 (Year: 2023).*

(Continued)

*Primary Examiner* — Dah-Wei D. Yuan
*Assistant Examiner* — Kristen A Dagenais
(74) *Attorney, Agent, or Firm* — Wenderoth, Lind & Ponack, L.L.P.

(57) ABSTRACT

An object of the present invention is to provide a method for forming an antiglare hard coat layer having a concavo-convex shape that exhibits a good antiglare property and being superior in scratch resistance.

12 Claims, No Drawings

(56) References Cited

U.S. PATENT DOCUMENTS

| | | | | |
|---|---|---|---|---|
| 2015/0165733 A1* | 6/2015 | Takihara | ................ | B32B 27/36 |
| | | | | 156/60 |
| 2016/0091635 A1* | 3/2016 | Ibuki | ..................... | G02B 1/118 |
| | | | | 359/507 |
| 2020/0124772 A1 | 4/2020 | Nakata et al. | | |

FOREIGN PATENT DOCUMENTS

| | | |
|---|---|---|
| JP | 2007-160603 | 6/2007 |
| JP | 2007-183653 | 7/2007 |
| JP | 2009-75248 | 4/2009 |
| JP | 2010-024447 | 2/2010 |
| JP | 2010-191370 | 9/2010 |
| JP | 2011-69913 | 4/2011 |
| JP | 2011-88340 | 5/2011 |
| JP | 2011-107297 | 6/2011 |
| JP | 2011-165821 | 8/2011 |
| JP | 2011-248289 | 12/2011 |
| JP | 2015-161899 | 9/2015 |
| JP | 2016-161834 | 9/2016 |
| KR | 10-2016-0024803 | 3/2016 |
| TW | 201234105 | 8/2012 |
| WO | 2017/170246 | 10/2017 |

OTHER PUBLICATIONS

Translation of the International Preliminary Report on Patentability and Written Opinion of the International Searching Authority issued Apr. 16, 2020 in International (PCT) Application No. PCT/JP2018/037463.

Extended European Search Report issued May 26, 2021, in corresponding European Patent Application No. 18865033.7.

International Search Report (ISR) issued Oct. 30, 2018 in International (PCT) Application No. PCT/JP2018/037463.

\* cited by examiner

METHOD FOR FORMING ANTI-GLARE HARD COAT LAYER

TECHNICAL FIELD

The present invention relates to a method for forming an antiglare hard coat layer, which is especially suitable for an optical laminated member such as a display.

Displays are used in a wide variety of fields such as computers, televisions, cellular phones, portable information terminal devices (tablet personal computers, mobile devices, electronic notebooks, etc.), and automobile display panels such as digital meters, instrument panels, navigation devices, console panels, center clusters and heater control panels. In many of such displays, an antiglare (AG) layer, which roughens the surface of a display, is provided on the display surface. By providing an antiglare layer on the surface of a display, it is possible to irregularly reflect external light by a concavo-convex shape on the surface of the antiglare layer and thereby blur the contour of an image reflected on the display surface. This makes it possible to reduce the visibility of the reflected image on the display surface and to eliminate obstacles to screen visibility due to reflection of the reflected image at the time of using the display.

As described above, the antiglare layer exhibits a function of irregularly reflecting external light by the concavo-convex shape of the surface thereof. Therefore, an antiglare layer is often provided on the surface layer side, for example, such as an outermost layer of an optical laminated member. In particular, in recent display devices such as high-definition displays, the pitch of light rays emitted from the displays has become finer. Therefore, in order to maintain image clarity, a finer and denser uneven shape is required.

Incidentally, the surface layer surface of an optical laminated member such as a display is also required to be superior in scratch resistance and durability. This is because, for example, when the scratch resistance of the surface layer is poor, the layer scratches easily and the visibility of the display is greatly reduced.

For example, JP-A-2011-69913 (Patent Literature 1) discloses an antiglare film that has an antiglare layer having fine irregularities on its surface on a transparent plastic film substrate and has a scratch-resistant layer on the outermost surface located on the antiglare layer side viewed from the substrate, wherein the average thickness of the scratch-resistant layer is 0.03 to 0.50 μm, and the scratch-resistant layer is formed of a curable composition containing at least components (A) inorganic fine particles having an average particle diameter of 40 nm or more and 100 nm or less, (B) inorganic fine particles having an average particle diameter of 1 nm or more and less than 40 nm, (C) an ionizing radiation-curable polyfunctional monomer, and (D) an organic polymer thickener, and comprises substantially no polymerizable fluorine-containing binder. Examples of a means for solving the above-mentioned problem include a method in which an antiglare layer and a scratch-resistant layer are separately provided as described in Patent Literature 1. However, when the antiglare layer and the scratch-resistant layer are provided separately, the number of layers increases. Providing functional layers separately may cause refraction at the interlayer surface due to the difference in refractive index of the layers, which may affect visibility.

JP-A-2007-183653 (Patent Literature 2) discloses (in claim 1), as an antiglare hard coat film that has a fine uneven structure on a surface thereof, exerts a good antiglare effect, has surface properties superior in scratch resistance, and also has a hard coat property, an antiglare hard coat film in which an active energy ray-curable resin coating layer is disposed on at least one side of a substrate made of a transparent plastic, the film having, on the surface of the active energy ray-curable resin coating layer, two types of uneven structures being formed of fine irregularities and differing in the vertical interval of the irregularities. Patent Literature 2 discloses (in claim 6), as a method for producing the antiglare hard coat film, that the active energy ray-curable resin is applied to at least one side of a substrate, and the active energy ray-curable resin coating layer is cured by applying active energy rays to the active energy ray-curable resin coating layer, and then a cured active energy ray-curable resin coating layer having, on its surface, a concavo-convex structure having two types of fine irregularities differing in the average vertical interval of the irregularities, is formed on the substrate by performing at least one of sand blasting or embossing.

CITATION LIST

Patent Literature

Patent Literature 1: JP-A-2011-69913
Patent Literature 2: JP-A-2007-183653

SUMMARY OF THE INVENTION

Technical Problems

The present invention solves the above-described conventional problems, and the object thereof is to provide a method for forming an antiglare hard coat layer having a concavo-convex shape that exhibits a good antiglare property and being superior in scratch resistance.

Solution to Problems

The present invention provides the following aspects to solve the aforementioned problems.

[1]

A method for forming an antiglare hard coat layer having a concavo-convex shape on a surface, on at least one surface of a transparent support substrate, comprising:
  a mold substrate production step of producing a mold substrate having a concavo-convex shape on a surface thereof;
  an application step of applying a hard coating composition to one surface of the transparent support substrate, thereby forming an uncured hard coat layer;
  a surface contact step of bringing both the substrates into surface contact with each other in a direction in which the concavo-convex shape surface of the mold substrate and a surface of the uncured hard coat layer face each other;
  a curing step of applying active energy rays, thereby curing the uncured hard coat layer; and
  a peeling step of peeling the mold substrate from the cured hard coat layer that has been cured,
  wherein
  the hard coating composition contains a polymerizable unsaturated group-containing oligomer or polymer having a weight-average molecular weight in the range of 1000 to 200000, the peel strength of the surface contact part of the concavo-convex shape surface of the mold substrate and the uncured hard coat layer surface is in the range of 0.01 to 2 N/25 mm, the peel strength of the surface contact part of the concavo-convex shape surface of the mold substrate and the hard coat layer after the application of the active energy rays is in the range of 0.005 to 1.5 N/25 mm, and the pressing force applied in the surface contact step of the concavo-convex shape surface of the mold substrate and the uncured hard coat layer surface is 0.001 to 5 MPa, and the concavo-convex shape transfer rate achieved when the pressing pressure is in the above range is 75 to 100%.

[2]
The method for forming an antiglare hard coat layer, wherein
the concavo-convex shape of the surface of the mold substrate is a concavo-convex shape formed by applying a concavo-convex shape-forming coating composition containing a first component and a second component, and then phase-separating the first component and the second component.

[3]
The method for forming an antiglare hard coat layer, wherein
the hard coating composition contains
a polymerizable unsaturated group-containing oligomer or polymer having the weight-average molecular weight in the range of 1000 to 200000, and
a polymerizable unsaturated group-containing monomer having a polymerizable unsaturated group equivalent of 90 to 500 g/eq,
the amount of the polymerizable unsaturated group-containing oligomer or polymer is 15 to 85 parts by mass per 100 parts by mass of the solid content of a layer-forming resin component contained in the hard coating composition, and the amount of the polymerizable unsaturated group-containing monomer is 85 to 15 parts by mass.

[4]
The method for forming an antiglare hard coat layer, wherein the polymerizable unsaturated group contained in the polymerizable unsaturated group-containing polymer is one or more selected from the group consisting of an acryloyl group and a methacryloyl group.

[5]
The method for forming an antiglare hard coat layer, wherein the hardness of the antiglare hard coat layer is a pencil hardness of 3H or higher.

[6]
The method for forming an antiglare hard coat layer, wherein
the antiglare hard coat layer having the concavo-convex shape on the surface thereof has a surface uneven shape having
a ten-point average roughness $Rz_{JIS}$ of 0.2 to 1.0 μm, and
an average length RSm of a roughness curve element of 5 to 100 μm.

[7]
The method for forming an antiglare hard coat layer, wherein
the hard coating composition further contains light transmissive fine particles having an average particle diameter of 0.5 to 10 μm, and a refractive index (Rf1) of the light transmissive fine particles and a refractive index (Rf2) of the layer-forming resin component contained in the hard coating composition satisfy the following relationship:

$$0.01 \leq |Rf1 - Rf2| \leq 0.23.$$

[8]
The method for forming an antiglare hard coat layer, wherein
the antiglare hard coat layer having the concavo-convex shape on the surface thereof has a surface uneven shape having
a sum total value (%) of transmitted image definitions (%) for optical combs with five widths of 0.125 mm, 0.25 mm, 0.5 mm, 1.0 mm and 2.0 mm is in the range of 300 to 480.

[9]
The method for forming an antiglare hard coat layer, further comprising, after the peeling step,
a step of forming one or more functional layers selected from the group consisting of a high refractive index layer, a low refractive index layer and an antifouling layer on the concavo-convex shape surface of the obtained antiglare hard coat layer.

[10]
The method for forming an antiglare hard coat layer, further comprising
a decorative layer forming step of forming a decorative layer on the other surface of the transparent support substrate.

[11]
A method for producing a display having an antiglare hard coat layer, comprising
a step of placing the antiglare hard coat layer obtained by the method described above on a surface of the display.

[12]
The production method described above, wherein the display is a touch panel display.

Effects of Invention

According to the formation method of the present invention, it is possible to form an antiglare hard coat layer having a surface uneven shape that exhibits a good antiglare performance and being superior in scratch resistance.

DESCRIPTION OF EMBODIMENTS

First, the process leading to the present invention will be described. The present inventors have studied a technique for improving the scratch resistance of an antiglare layer. One of conceivable means for improving the scratch resistance of an antiglare layer is a means of improving a crosslinking density in order to increase the hardness of a coating layer. On the other hand, as a result of increasing the crosslinking density of the coating layer, the surface uneven shape of the antiglare layer may be affected. For example, a fine shape can be formed by applying a coating composition containing a first component and a second component, and then phase-separating the first component and the second component. On the other hand, when a design for increasing the crosslinking density of a resulting antiglare layer is executed in the coating composition containing the first component and the second component, the property and state and the phase separation conditions of the coating composition are changed, so that the fineness of the concavo-convex shape tended to be impaired. Furthermore, when the formation of a finer uneven shape was attempted by using the coating composition containing the first component and the second component, it was found by experiments that the crosslinking density and the thickness of a coating layer tended to decrease. As described above, especially in the case of using the coating composition containing the first component and the second component, it was one of the technical challenges to form a fine uneven shape while improving the scratch resistance.

The present inventors have investigated, for example, a method for forming an antiglare hard coat layer having a fine uneven shape capable of being formed by using a coating composition containing a first component and a second component, and being superior in scratch resistance. During such investigations, a means for transferring a concavo-convex shape onto a surface of a hard coat layer using an antiglare layer with a fine uneven shape as a mold has been investigated. Then, they have accomplished the present invention by finding that an antiglare hard coat layer having a fine uneven shape and being superior in scratch resistance can be formed by using, as a mold, an antiglare layer having a fine uneven shape on a surface thereof, using a hard coating composition containing specific components, and transferring the concavo-convex shape to the hard coat layer by a specific step. Hereafter, the present invention will be described in detail.

The method for forming an antiglare hard coat layer of the present invention is a method of providing an antiglare hard coat layer having a concavo-convex shape on a surface thereof to a transparent support substrate on at least one surface thereof, comprising:

a mold substrate production step of producing a mold substrate having a concavo-convex shape on a surface thereof;

an application step of applying a hard coating composition to one surface of the transparent support substrate, thereby forming an uncured hard coat layer;

a surface contact step of bringing both the substrates into surface contact with each other in a direction in which the concavo-convex shape surface of the mold substrate and a surface of the uncured hard coat layer face each other;

a curing step of applying active energy rays, thereby curing the uncured hard coat layer; and a peeling step of peeling the mold substrate from the cured hard coat layer.

Production of Mold Substrate

In the present description, the "mold substrate" means a substrate having a concavo-convex shape surface, and the concavo-convex shape surface of the mold substrate is to be brought into surface contact with a surface of an uncured hard coat layer obtained by applying an antiglare hard coating composition in a direction in which both the surfaces face each other, so that the concavo-convex shape is transferred and a concavo-convex shape is formed on a surface of a hard coat layer.

The concavo-convex shape surface of the mold substrate can be formed by various methods for forming a concavo-convex shape surface that are usually used in the art. As a commonly used method, for example, by applying and then curing a coating composition containing fine particles having an average particle diameter of 0.1 to 5 μm, a concavo-convex shape surface caused by the particle size of the fine particles can be formed. Examples of the fine particles include inorganic oxide particles, such as silica ($SiO_2$) particles, alumina particles, titania particles, tin oxide particles, antimony-doped tin oxide (abbreviated as ATO) particles, and zinc oxide particles, and organic resin particles, such as polystyrene particles, melamine resin particles, acrylic particles, acrylic-styrene particles, silicone particles, polycarbonate particles, polyethylene particles, and polypropylene particles. One example of another method may be a method of forming a concavo-convex shape surface by means such as cutting a surface of a substrate.

The concavo-convex shape on the surface of the mold substrate is preferably a concavo-convex shape formed by applying a concavo-convex shape-forming coating composition containing the first component and the second component, and then phase-separating the first component and the second component. Since the arrangement of unevenness of the concavo-convex shape resulting from the phase separation of the first component and the second component is naturally determined, an irregular uneven shape can be formed. This affords the advantage that generation of moire or the like due to the regularity of the arrangement of unevenness does not accompany. Furthermore, forming the mold substrate by applying the concavo-convex shape-forming coating composition containing the first component and the second component to the transparent substrate affords the advantage that a mold substrate having a high active energy ray transmittance can be formed. Using a mold substrate having a high active energy ray transmittance affords the advantage that an uncured hard coat layer can be cured by applying active energy rays from the mold substrate side in the curing step described in detail below.

The combination of the first component and the second component that generate phase separation in the concavo-convex shape-forming coating composition may be an embodiment where the SP value of the first component ($SP_1$) and the SP value of the second component ($SP_2$) satisfy the following conditions:

$$SP_2 < SP_1$$

$$SP_1 - SP_2 \geq 0.5.$$

If a concavo-convex shape-forming coating composition containing the first component and the second component satisfying the above conditions is applied to a substrate, the first component and the second component undergo phase separation based on the difference in SP values of the first component and the second component, and thus a coating film having continuous random unevenness on a surface thereof can be formed.

The SP value is an abbreviation of solubility parameter and is a measure of solubility. The larger the SP value, the higher the polarity, while the smaller the value thereof, the lower the polarity.

For example, the SP value can be measured by the following method [reference: SUH, CLARKE, J.P.S.A-1, 5, 1671-1681 (1967)].

Measurement temperature: 20° C.

Sample: 0.5 g of resin is weighed in a 100 ml beaker, 10 ml of a good solvent is added with a volumetric pipette, and the sample is dissolved with a magnetic stirrer.

Solvent:

Good solvent . . . dioxane, acetone, etc.

Poor solvent . . . n-hexane, ion exchanged water, etc.

Turbidity point measurement: A poor solvent is dropped using a 50 ml burette, and the point at which turbidity occurs is taken as the amount of dripping.

The SP value δ of resin is calculated by the following equations.

$$\delta = (V_{ml}^{1/2}\delta_{ml} + V_{mh}^{1/2}\delta_{mh})/(V_{ml}^{1/2} + V_{mh}^{1/2})$$

$$V_m = V_1 V_2/(\phi_1 V_2 + \phi_2 V_1)$$

$$\delta_m = \phi_1 \delta_1 + \phi_2 \delta_2$$

Vi: the molecular volume of the solvent (ml/mol)
φi: the volume fraction of each solvent at the turbidity point
δi: the SP value of the solvent
ml: low SP poor solvent mixed system
mh: high SP poor solvent mixed system The difference between the SP value of the first component and the SP value of the second component is preferably 0.5 or more, and more preferably 0.8 or more. The upper limit of the difference in SP value is not particularly limited, but it is generally 15 or less. When the difference between the SP value of the first component and the SP value of the second component is 0.5 or more, the compatibility of the components is low, whereby phase separation between the first component and the second component is expected to occur after the concavo-convex shape-forming coating composition is applied.

In this embodiment, it is preferable that an active energy ray-curable component is contained as the first component. In addition, it is preferable that an unsaturated double bond-containing acrylic copolymer is used as the second component.

As the first component, a monomer, oligomer or polymer having at least one unsaturated double bond group is preferably contained. Specific examples thereof include a (meth)acrylate monomer, a (meth)acrylate oligomer, a (meth)acrylate polymer, a urethane (meth)acrylate oligomer, and a urethane (meth)acrylate polymer, which each have at least one unsaturated double bond group, and modified monomers, oligomers or polymers thereof. The first component preferably contains at least one species selected from polyfunctional (meth)acrylate compounds and polyfunctional urethane (meth)acrylate compounds, such as a polyfunctional (meth)acrylate monomer, a polyfunctional (meth)acrylate oligomer, a polyfunctional (meth)acrylate polymer, a polyfunctional urethane (meth)acrylate monomer, a polyfunctional urethane (meth)acrylate oligomer, and a polyfunctional urethane (meth)acrylate polymer. Containing such a compound leads to the advantage that the crosslinking density after curing can be increased and the effect of increasing surface hardness can be enhanced.

It is more preferable that the first component contains a polyfunctional (meth)acrylate monomer. Specific examples of the polyfunctional (meth)acrylate include polypropylene glycol di(meth)acrylate, polyethylene glycol di(meth)acrylate, 1,3-adamantyldimethanol di(meth)acrylate, trimethylolpropane tri(meth)acrylate, trimethylolpropane ethylene oxide-modified tri(meth)acrylate, trimethylolpropane propylene oxide-modified tri(meth)acrylate, isocyanuric acid ethylene oxide-modified di(meth)acrylate, isocyanuric acid ethylene oxide-modified tri(meth)acrylate, pentaerythritol tri(meth)acrylate, pentaerythritol tetra(meth)acrylate, dimethylolpropane tetra(meth)acrylate, dipentaerythritol penta(meth)acrylate, and dipentaerythritol hexa(meth)acrylate, and the like.

The (meth)acrylate monomer, the (meth)acrylate oligomer, and the urethane (meth)acrylate oligomer preferably have a weight-average molecular weight of less than 5,000. For example, the (meth)acrylate monomer and the urethane (meth)acrylate monomer preferably have a molecular weight of 70 or more and a weight-average molecular weight of less than 3000, more preferably a molecular weight of 70 or more and a weight-average molecular weight of less than 2500. The (meth)acrylate oligomer and the urethane (meth)acrylate oligomer preferably have a weight-average molecular weight of 100 or more and less than 5000. The (meth)acrylate polymer and the urethane (meth)acrylate polymer preferably have a weight-average molecular weight of less than 50,000.

Examples of the second component include unsaturated double bond-containing acrylic copolymers and cellulose resins. Examples of the unsaturated double bond-containing acrylic copolymer include products prepared by adding a component having an unsaturated double bond and another functional group, such as acrylic acid and glycidyl acrylate, to a resin produced by copolymerizing a (meth)acrylic monomer with another monomer having an ethylenically unsaturated double bond, a resin produced by reacting a (meth)acrylic monomer with another monomer having an ethylenically unsaturated double bond and an epoxy group, a resin produced by reacting a (meth)acrylic monomer with another monomer having an ethylenically unsaturated double bond and an isocyanate group, or the like. The unsaturated double bond-containing acrylic copolymers may be used singly, or two or more species thereof may be used in combination. The unsaturated double bond-containing acrylic copolymer preferably has a weight-average molecular weight of 3,000 to 100,000, and more preferably 3,000 to 50,000.

Examples of the cellulose resin include cellulose acetate butyrate and cellulose acetate propionate.

The mass ratio of the first component to the second component, the first component: the second component, is preferably 98.5:1.5 to 55:45, more preferably 98.5:1.5 to 60:40, and even more preferably 98:2 to 70:30.

The concavo-convex shape-forming coating composition preferably contains a photopolymerization initiator. The existence of the photopolymerization initiator causes resin components to be well polymerized by irradiation with active energy rays such as ultraviolet rays. Examples of the photopolymerization initiator include alkylphenone-based photopolymerization initiators, acylphosphine oxide-based photopolymerization initiators, titanocene-based photopolymerization initiators, oxime ester-based polymerization initiators, and the like. A preferable amount of the photopolymerization initiator is 0.01 to 20 parts by mass, and more preferably 1 to 10 parts by mass based on 100 parts by mass of the resin component of the concavo-convex shape-forming coating composition. The photopolymerization initiators may be used singly or two or more photopolymerization initiators may be used in combination.

The surface concavo-convex shape is formed by applying and then curing the above-described concavo-convex shape-forming coating composition to a substrate. The method of applying the concavo-convex shape-forming coating composition may be appropriately selected according to the composition and the situation of the application step, and the composition may be applied, for example, by a dip coating method, an air knife coating method, a curtain coating method, a roller coating method, a wire bar coating method, a die coating method, an inkjet method, a gravure coating method, an extrusion coating method (U.S. Pat. No. 2,681,294) or the like. As the substrate on which the concavo-convex shape-forming coating composition is applied, for example, various polymer substrates can be used. As the substrate, a transparent support substrate described in detail below may be used.

By curing the coating film obtained by applying the concavo-convex shape-forming coating composition, phase separation of the first component and the second component contained in the composition is caused, so that a mold substrate having a concavo-convex shape surface can be formed. This curing can be carried out by irradiation with a light source that emits active energy rays with a required wavelength. For example, light having an integral dose of 30 to 5000 mJ/cm$^2$ can be used as the active energy rays for irradiation. The wavelength of the irradiation light is not particularly limited and, for example, ultraviolet light having a wavelength of 360 nm or less or the like can be used. The light can be obtained by using a high pressure mercury lamp, an extra-high pressure mercury lamp or the like.

Transparent Support Substrate

As the transparent support substrate on which an antiglare hard coat layer is formed, various substrates used in the art can be used without any particular limitations. Examples of the transparent support substrate include substrates made of transparent polymers such as films of polycarbonate, films of polyester such as polyethylene terephthalate and polyethylene naphthalate; films of cellulose such as diacetyl cellulose and triacetyl cellulose; and films of acrylic substance such as polymethyl methacrylate. Further examples of the transparent support substrate also include substrates made of transparent polymers such as films of styrene-based substances such as polystyrene and acrylonitrile-styrene copolymers; films of olefin-based substances such as polyvinyl chloride, polyethylene, polypropylene, polyolefins having a cyclic or norbornene structure, and ethylene-propylene copolymers; and films of amide-based substances such as nylon and aromatic polyamides.

Furthermore, examples of the transparent support substrate also include substrates made of transparent polymers such as polyimide, polysulfone, polyether sulfone, polyether ether ketone, polyphenylene sulfide, polyvinyl alcohol, polyvinylidene chloride, polyvinyl butyral, polyallylate, polyoxymethylene, epoxy resins, and blends of the above polymers.

Further, the transparent support substrate may be a laminate of a plurality of substrates made of transparent polymers. For example, the transparent polymer substrate may be a laminate of a film of an acrylic resin and a film of a polycarbonate-based resin or a laminate of a sheet of an acrylic resin and a sheet of a polycarbonate-based resin.

Among the transparent polymer substrate, as the transparent support substrate, a substrate with low optical birefringence, a substrate with a phase difference controlled to ¼ of a wavelength (e.g., 550 nm), i.e., λ/4, or ½ of a wavelength, i.e., λ/2, or a substrate with uncontrolled birefringence can be selected from such transparent polymer substrates in view of its use.

The thickness of the transparent support substrate can be appropriately chosen according to the use thereof, the method of processing the member, etc. In general, in view of strength and workability such as handleability, the thickness is about 10 to 5000 μm, preferably 20 to 3000 μm, and more preferably 30 to 3000 μm.

Application Step

In the application step, the hard coating composition is applied to at least one surface of the transparent support substrate to form an uncured hard coat layer.

Hard Coating Composition

The hard coating composition to be used in the application step comprises a polymerizable unsaturated group-containing oligomer or polymer having a weight-average molecular weight in the range of 1000 to 200000. The polymerizable unsaturated group-containing oligomer or polymer is the layer-forming resin component of a hard coat layer.

The aforementioned method has a step of bringing a mold substrate into surface contact with an uncured hard coat layer obtained by applying the hard coating composition. Therefore, it is required to hold the hard coat layer obtained by coating as a layer even if the mold substrate is brought into surface contact with the hard coating composition in an uncured state. In such a method, containing a polymerizable unsaturated group-containing oligomer or polymer having a weight-average molecular weight in the range of 1000 to 200000 as a layer-forming resin component of a hard coat layer affords the advantage that the surface contact step can be performed successfully.

The polymerizable unsaturated group-containing oligomer or polymer is an oligomer or polymer having a polymerizable unsaturated group and having a weight-average molecular weight in the range of 1000 to 200000. The polymerizable unsaturated group of the polymerizable unsaturated group-containing oligomer or polymer is preferably one or more selected from the group consisting of an acryloyl group and a methacryloyl group.

Examples of the polymerizable unsaturated group-containing oligomer or polymer include a urethane (meth)acrylate oligomer or polymer having a weight-average molecular weight in the range of 1000 to 200000 and an acrylic (meth)acrylate oligomer or polymer having a weight-average molecular weight in the range of 1000 to 200000.

The urethane (meth)acrylate oligomer or polymer can be prepared by, for example, (1) a method involving making a compound having a hydroxyl group and an acryloyl group (or methacryloyl group) undergo an addition reaction to a polyisocyanate compound having a terminal isocyanate group in its molecule, (2) a method involving reacting an isocyanate group-containing (meth)acrylate monomer with a polyurethane polyol obtained by reacting a polyisocyanate compound with a polyol, or the like.

Examples of the polyisocyanate compound include divalent or trivalent polyisocyanate compounds such as 2,4-tolylene diisocyanate, 2,6-tolylene diisocyanate, 1,3-xylene diisocyanate, 1,4-xylene diisocyanate, xylylene diisocyanate, 1,5-naphthalene diisocyanate, m-phenylene diisocyanate, p-phenylene diisocyanate, diphenylmethane diisocyanate, 4,4'-diphenylmethane diisocyanate, 4,4'-dibenzyl diisocyanate, isophorone diisocyanate, hexamethylene diisocyanate, dicyclohexylmethane diisocyanate, 2,2,4-trimethylhexamethylene diisocyanate, and 2,4,4-trimethylhexamethylene diisocyanate or diisocyanate compounds obtained by hydrogenating aromatic isocyanates selected from among the foregoing diisocyanate compounds (e.g., diisocyanate compounds such as hydrogenated xylylene diisocyanate and hydrogenated diphenylmethane diisocyanate), triphenylmethane triisocyanate, and dimethylenetriphenyl triisocyanate, biuret type adducts and isocyanurate ring type adducts of these diisocylanates, and the like.

Examples of the compound having a hydroxyl group and an acryloyl group (or methacryloyl group) referred to in the above (1) include pentaerythritol tri(meth)acrylate, dipentaerythritol penta(meth)acrylate, 2-hydroxyethyl (meth)acrylate, and glycerol di(meth)acrylate, and alkylene oxide-modified or lactone-modified compounds obtained by adding ethylene oxide, propylene oxide, ε-caprolactone, γ-butyrolactone, or the like to the compounds listed above.

Examples of the polyol referred to in the above (2) include ethylene glycol, propylene glycol, butylene glycol, neopentyl glycol, 1,6-hexanediol, trimethylolpropane, glycerin, pentaerythritol, polycaprolactone diol, polyester polyol, polyether polyol, and the like.

Examples of the isocyanate group-containing (meth)acrylate monomer referred to in the above (2) include unsaturated compounds each prepared by adding a polyisocyanate compound such as hexamethylene diisocyanate to an active hydrogen-containing polymerizable monomer such as isocyanate ethyl acrylate, isocyanate propyl acrylate, and hydroxyethyl acrylate.

The urethane (meth)acrylate oligomer or polymer may also be a urethane urea (meth)acrylate oligomer or polymer having a urea linkage. The urethane urea (meth)acrylate oligomer or polymer can be prepared, for example, by using a polyamine in combination with the polyol referred to in the above (2).

The acrylic (meth)acrylate oligomer or polymer is an acrylic oligomer or polymer containing an acryloyl group and/or a methacryloyl group. Specific examples thereof include a compound prepared by adding (meth)acrylic acid to an acrylic resin copolymerized with glycidyl methacrylate, a compound prepared by adding 2-hydroxyethyl (meth)acrylate, 4-hydroxybutyl (meth)acrylate or pentaerythritol tri(meth)acrylate to an acrylic resin copolymerized with 2-acryloyloxyethyl isocyanate, and a resin prepared by adding 2-acryloyloxyethyl isocyanate to an acrylic resin copolymerized with a hydroxyl group-containing monomer. These may be used singly, or two or more of them may be used in combination.

Among the urethane (meth)acrylate oligomers or polymers and acrylic (meth)acrylate oligomers or polymers as described above, those having a weight-average molecular weight in the range of 1000 to 200000 can be used. The polymerizable unsaturated group-containing oligomer or polymer preferably has two or more, more preferably 3 or more, and even more preferably 5 or more functional groups of one or more types selected from the group consisting of an acryloyl group and a methacryloyl group.

A commercially available product may be used as the polymerizable unsaturated group-containing oligomer or polymer. As a commercial product of the urethane (meth)acrylate oligomer or polymer, for example, DPHA-40H, UX-5000, UX-5102D20, UX-5103D, UX-5005, UX-3204, UX-4101, UXT-6100, UX-6101, UX-8101, UX-0937, UXF-4001-M35, and UXF-4002 manufactured by Nippon Kayaku Co., Ltd.;

UF-8001G and UA-510H manufactured by Kyoeisha Chemical Co., Ltd.;

EBECRYL 244, EBECRYL 284, EBECRYL 8402, EBECRYL 8807, EBECRYL 264, EBECRYL 265, EBECRYL 9260, EBECRYL 8701, EBECRYL 8405, EBECRYL 1290, EBECRYL 5129, EBECRYL 220, KRM 8200, KRM 7804, and KRM 8452 manufactured by Daicel-Allnex Ltd.;

Shikoh UV-1600B, Shikoh UV-1700B, Shikoh UV-6300B, Shikoh UV-7600B, Shikoh UV-7640B, Shikoh UV-7461B, Shikoh UV-7650B, Shikoh UV-3520EA, Shikoh UV-6640B, Shikoh UV-7000B, and Shikoh UV-305F manufactured by The Nippon Synthetic Chemical Industry Co., Ltd.;

CN-9001, CN-9004, CN-9005, CN-965, CN-9178, CN-9893, CN-9782, CN-964, CN-9013, and CN-9010; manufactured by Arkema;

U-10PA, U-10HA, UA-33A, UA-53H, UA-32P, U-1511A, UA-122P, UA-160TM, UA-31F, UA-7100, UA-4200, and UA-4400 manufactured by Shin-Nakamura Chemical Co., Ltd.;

Art-Resin UN-3320HA, Art-Resin UN-3320HB, Art-Resin UN-332011C, Art-Resin UN-3320HS, Art-Resin UN-904, Art-Resin UN-901T, Art-Resin UN-905, Art-Resin UN-951, ArtResin UN-952, Art-Resin UN-953, Art-Resin UN-954, Art-Resin UN-906, Art-Resin UN-906S, Art-Resin UN-907, Art-Resin UN-908, Art-Resin UN-333, Art-Resin UN-5507, Art-Resin UN-6300, Art-Resin UN-6301, Art-Resin UN-7600, Art-Resin UN-7700, Art-Resin UN-9000PEP, Art.-Resin UN-9200, ArtResin UN-904UREA, and Art-Resin UN-H7UREA manufactured by Negami Chemical Industrial Co., Ltd.;

can be used.

As a commercial product of the acrylic (meth)acrylate oligomer or polymer, for example, UNIDIC V-6840, UNIDIC V-6841, UNIDIC V-6850, UNIDIC EMS-635, and UNIDIC WHV-649 manufactured by DIC Corporation;

HITALOID 7975, HITALOID 7977, HITALOID 7988, and HITALOID 7975D manufactured by Hitachi Chemical Company, Ltd.;

ART CURE RA-3969MP, ART CURE RA-3960PG, ART CURE RA-3602MI, ART CURE OAP-5000, ART CURE OAP-2511, ART CURE AHC-9202M180, ART CURE RA-3704MB, ART CURE RA-3953MP, ART CURE RA-4101, ART CURE MAP-4000, and ART CURE MAP2801 manufactured by Negami Chemical Industrial Co., Ltd., can be used.

The polymerizable unsaturated group-containing oligomers or polymers may be used singly, or two or more species thereof may be used in combination.

The condition that the hard coating composition contains the polymerizable unsaturated group-containing oligomer or polymer having a weight-average molecular weight in the range of 1000 to 200000 affords the advantage that in the surface contact step described below, it is possible to transfer the concavo-convex shape of a surface of a mold substrate to an uncured hard coat layer while maintaining the thickness of the uncured hard coat layer. In addition, the condition that the polymerizable unsaturated group is contained affords the advantage that scratch resistance and chemical resistance are improved as a result of curing and no defects in appearance caused by bleeding out after the evaluation of moisture heat resistance, heat resistance, light resistance, etc. occur.

The hard coating composition may further comprise a polymerizable unsaturated group-containing monomer as necessary. The polymerizable unsaturated group-containing monomer is a layer-forming resin component of a hard coat layer similarly to the polymerizable unsaturated group-containing polymer. The polymerizable unsaturated group-containing monomer is required to have a polymerizable unsaturated group equivalent of 90 to 500 g/eq.

The condition that the hard coating composition further contains the polymerizable unsaturated group-containing monomer affords the advantage that the scratch resistance of a resulting antiglare hard coat layer can be improved. Furthermore, it also affords the advantage that application workability can be improved through the preparation of viscosity and peel strength after bonding can be adjust into a suitable range.

As the polymerizable unsaturated group-containing monomer, for example, a polyfunctional (meth)acrylate monomer having a polymerizable unsaturated group equivalent of 90 to 500 g/eq can be used. The polyfunctional (meth)acrylate monomer can be prepared by making a polyhydric alcohol and a (meth)acrylate undergo dealcoholization together.

Examples of the polyfunctional (meth)acrylate monomer having a polymerizable unsaturated group equivalent of 90 to 500 g/eq include
- bifunctional (meth)acrylate monomers such as ethylene glycol di(meth)acrylate, 1,6-hexane diol di(meth)acrylate, polyethylene glycol (200) di(meth)acrylate, allyl (meth)acrylate, 1,4-butanediol di(meth)acrylate, neopentyl glycol di(meth)acrylate, dioxane glycol di(meth)acrylate, ethoxylated (2) bisphenol A di(meth)acrylate, ethoxylated (3) bisphenol A di(meth)acrylate, ethoxylated (4) bisphenol A di(meth)acrylate, ethoxylated (10) bisphenol A di(meth)acrylate, propoxylated (3) bisphenol A di(meth)acrylate, tricyclodecane dimethanol di(meth)acrylate, and 9,9-bis[4-(2-hydroxyethoxy)phenyl]fluorene di(meth)acrylate;
- trifunctional (meth)acrylate monomers such as glycerin tri(meth)acrylate, trimethylolpropane tri(meth)acrylate, ethoxylated (3) trimethylolpropane triacrylate, ethoxylated (6) trimethylolpropane triacrylate, ethoxylated (9) trimethylolpropane triacrylate, propoxylated (3) trimethylolpropane triacrylate, propoxylated (6) trimethylolpropane triacrylate, propoxylated (9) trimethylolpropane triacrylate, pentaerythritol tri(meth)acrylate, ethoxylated (4) pentaerythritol tri(meth)acrylate, ethoxylated (8) pentaerythritol tri(meth)acrylate, tris(2-hydroxyethyl)isocyanurate tri(meth)acrylate, caprolactone-modified (1) tris(2-hydroxyethyl)isocyanurate tri(meth)acrylate, and caprolactone-modified (3) tris(2-hydroxyethyl)isocyanurate tri(meth)acrylate;
- tetrafunctional (meth)acrylate monomers such as pentaerythritol tetra(meth)acrylate, dipentaerythritol tetra(meth)acrylate, tripentaerythritol tetra(meth)acrylate, ditrimethylolpropane tetra(meth)acrylate, ethoxylated (4) pentaerythritol tetra(meth)acrylate, and ethoxylated (8) pentaerythritol tetra(meth)acrylate;
- pentafunctional (meth)acrylate monomers such as dipentaerythritol penta(meth)acrylate and tripentaerythritol penta(meth)acrylate;
- hexafunctional (meth)acrylate monomers such as dipentaerythritol hexa(meth)acrylate and tripentaerythritol hexa(meth)acrylate; and
- hepta or more functional (meth)acrylate monomers such as tripentaerythritol hepta(meth)acrylate and tripentaerythritol octa(meth)acrylate.

The polyfunctional (meth)acrylate monomers may be used singly or two or more species thereof may be used in combination.

When the hard coating composition contains a polymerizable unsaturated group-containing oligomer or polymer having a weight-average molecular weight in the range of 1000 to 200000 and a polymerizable unsaturated group-containing monomer having a polymerizable unsaturated group equivalent of 90 to 500 g/eq, the amount of the polymerizable unsaturated group-containing oligomer or polymer is 15 to 85 parts by mass per 100 parts by mass of the solid content of a layer-forming resin component contained in the hard coating composition, and the amount of the polymerizable unsaturated group-containing monomer is 85 to 15 parts by mass. The condition that the above mass ranges are satisfied affords the advantage that has an advantage that good concavo-convex shape transfer rate, scratch resistance and chemical resistance can be attained in a resulting antiglare hard coat layer.

The hard coating composition may further comprise light transmissive fine particles having an average particle diameter in the range of 0.5 to 10 μm as necessary. The condition that the hard coating composition contains light transmissive fine particles having an average particle diameter in the range of 0.5 to 10 μm affords the advantage that the sparkling (glare) property of a resulting antiglare hard coat layer can be suppressed and the hardness can be increased. The average particle diameter is more preferably in the range of 1.0 to 10 μm.

Sparkling is a phenomenon in which irregularities of brightness occur in a coat layer. A display device such as a display displays images by emitting light from the inside thereof. Here, the light rays emitted from the inside of the display device change in the incident state depending on the concavo-convex state of the coat layer, and may cause the light amount to converge when the light incident on the concavo-convex state is emitted. The convergence of the light amount causes the irregularity of brightness, which is recognized as sparkling. The sparkling has the problem of causing eyestrain of those who watch the display device.

As used herein, "light transmissive fine particles" means transparent or translucent fine particles having an average light transmittance of 30% or more for visible light. The average particle diameter of the light transmissive fine particles is a value according to D50. D50 referred to herein is a particle diameter at which a cumulation in volume measured using a laser diffraction particle size distribution analyzer is 50%.

As the light transmissive fine particles, it is preferable to use those with which the refractive index (Rf1) of the light transmissive fine particles and the refractive index (Rf2) of the layer-forming resin component contained in the hard coating composition satisfy the following relationship:

$$0.01 \leq |Rf1 - Rf2| \leq 0.23.$$

The condition that the refractive index (Rf1) of the light transmissive fine particles and the refractive index (Rf2) of the layer-forming resin component contained in the hard coating composition satisfy the above relationship affords the advantage that the sparkling prevention performance of the resulting antiglare hard coat layer is improved, so that a good antiglare performance can be obtained.

The refractive index (Rf1) of the light transmissive fine particles and the refractive index (Rf2) of the layer-forming resin component contained in the hard coating composition can be measured using, for example, an Abbe refractometer.

As the light transmissive fine particles having an average particle diameter in the range of 0.5 to 10 μm, organic fine particles or inorganic fine particles having an average particle diameter in the above range can be used. Commercially available products may be used as the light transmissive fine particles having an average particle diameter in the range of 0.5 to 10 μm. Examples of such commercially available products include Techpolymer SSX series (styrene-acrylic copolymer fine particles) manufactured by Sekisui Plastics Co., Ltd., Chemisnow SX series (styrene polymer fine particles) and Chemisnow MX series (acrylic polymer fine particles) manufactured by Soken Chemical & Engineering Co., Ltd., SEAHOSTAR KE-P, KE-S series (silica fine particles), SOLIOSTAR RA (silicon-acrylic copolymer fine particles), EPOSTAR S12 (melamine polymer fine particles), EPOSTAR MA series (styrene-acrylic copolymer fine particles), and acrylic copolymer fine particles manufactured by Nippon Shokubai Co., Ltd., MSP series and NH series (silicone fine particles) manufactured by Nikko Rica Corporation, and AZ series and AY series (alumina fine particles) manufactured by Nippon Steel & Sumikin Materials Co., Ltd. The above-mentioned Techpolymer SSX series (styrene-acrylic copolymer fine particles), Chemisnow SX series (styrene polymer fine particles) and EPOSTAR MA series (styrene-acrylic copolymer fine particles) are more preferable because of having a suitable refractive index (Rf1) that satisfies the above relationship and being superior in dispersibility.

Other Components

The hard coating composition preferably comprises a photopolymerization initiator. The existence of the photopolymerization initiator causes resin components to be well polymerized by irradiation with active energy rays such as ultraviolet rays. As an example of the photopolymerization initiator, the above-described photopolymerization initiator can be suitably used. The amount of the photopolymerization initiator is preferably 0.01 to 20 parts by mass, more preferably 1 to 10 parts by mass based on 100 parts by mass of the resin component of the hard coating composition. Photopolymerization initiators may be used singly or two or more photopolymerization initiators may be used in combination.

Various additives may be added to the hard coating composition, if necessary. Examples of such additives include conventional additives such as photopolymerization initiators, antistatic agents, plasticizers, surfactants, antioxidants, ultraviolet absorbers, surface conditioners, and leveling agents.

As other components, for example, fine particles having an average particle diameter of less than 0.5 μm may be used. Examples of such fine particles include light transmissive fine particles having an average particle diameter D50 of 5 nm or more and less than 500 nm. Examples of the light transmissive fine particles having an average particle diameter D50 of 5 nm or more and less than 500 nm include organic fine particles or inorganic fine particles on the nanometer order. It is preferable to use colloidal silica as the light transmissive fine particles. The colloidal silica may be either reactive colloidal silica in which reactive groups such as (meth)acryloyl groups are introduced on the surface of the silica particles by surface modification or silica particles having no reactive groups on the surface thereof or non-reactive colloidal silica the surface of which is modified with non-reactive organic groups.

The hard coating composition can be prepared by a method commonly practiced by those skilled in the art. For example, it can be prepared by mixing the above-described components by using a commonly used mixing device such as a paint shaker, a mixer, and a disper.

Application of Hard Coating Composition

In the application step, the hard coating composition is applied to at least one side of the transparent support substrate to form an uncured hard coat layer. The application of the hard coating composition may be appropriately chosen according to the property and state of the hard coating composition and the situation of the application step, and the hard coating composition may be applied, for example, by a dip coating method, an air knife coating method, a curtain coating method, a roller coating method, a wire bar coating method, a die coating method, an inkjet method, a gravure coating method, or an extrusion coating method (U.S. Pat. No. 2,681,294).

In the application of the hard coating composition, it is preferable to apply it such that the thickness of the uncured hard coat layer is in the range of 0.5 to 20 μm, and more preferably such that the thickness of the film is in the range of 1 to 15 μm. The condition that the thickness is within the above range affords the advantage that the impact resistance, heat resistance, curl resistance, crack resistance, scratch resistance, and hardness of a resulting antiglare hard coat layer can be designed into favorable ranges.

Surface Contact Step

In the surface contact step, the concavo-convex shape surface of the mold substrate is brought into surface contact with the uncured hard coat layer formed in the application step in a direction in which the concavo-convex shape of the mold substrate faces the surface of the hard coat layer. As a result, the surface shape of the uncured hard coat layer is deformed into a concavo-convex shape of the surface of the mold substrate that comes into surface contact, so that the concavo-convex shape of the surface of the mold substrate is transferred onto the surface of the uncured hard coat layer.

The pressing pressure applied during the surface contact step of the concavo-convex shape surface of the mold substrate and the uncured hard coat layer surface is in the range of 0.001 to 25 MPa. The pressure is preferably in the range of 0.001 to 5 MPa, and more preferably in the range of 0.005 to 5 MPa. Owing to the condition that the pressing pressure is in the above range, the concavo-convex shape of the mold substrate can be transferred to the uncured hard coat layer, and the generation of voids between the concavo-convex shape surface of the mold substrate and the uncured hard coat layer, the deformation of the substrate, the non-uniformization of film thickness, and the protrusion of a coating film from an edge part can be prevented.

The peel strength of the surface contact part of the concavo-convex shape surface of the mold substrate and the uncured hard coat layer surface is preferably in the range of 0.01 to 2 N/25 mm. The condition that the peel strength of the surface contact part in the case where the hard coat layer surface is uncured is within the above range affords the advantage that the undulation between the mold substrate and the uncured hard coat layer is suppressed, so that the concavo-convex shape of the mold substrate can be transferred well to the uncured hard coat layer. A further advantage is that defective shape transfer due to defective surface contact can be suppressed, so that yield can be improved and workability can be improved.

Examples of a method for adjusting the peel strength of the surface contact part of the concavo-convex shape surface of the mold substrate and the uncured hard coat layer surface within the above range include a method involving using a hard coating composition containing a polymerizable unsaturated group-containing oligomer or polymer having a weight-average molecular weight within the range of 1000 to 200000 and a polymerizable unsaturated group-containing monomer having a polymerizable unsaturated group equivalent of 90 to 500 g/eq.

Curing Step

In the curing step, active energy rays are applied with the concavo-convex shape surface of the mold substrate and the uncured hard coat layer being in surface contact with each other, thereby curing the uncured hard coat layer. The application of active energy rays may be performed from the transparent support substrate side where the uncured hard coat layer is disposed, and when the mold substrate is light transmissive, the active energy rays may be applied from the mold substrate side.

The irradiation with active energy rays can be carried out by irradiation using a light source that emits active energy rays with a required wavelength. For example, light having an integral dose of 15 to 5000 mJ/cm$^2$ can be used as the active energy rays for irradiation. The wavelength of the irradiation light is not particularly limited and, for example, ultraviolet light having a wavelength of 360 nm or less can be used. The light can be obtained by using a high pressure mercury lamp, an extra-high pressure mercury lamp or the like.

Peeling Step

In the peeling step, the mold substrate is peeled off from the hard coat layer cured in the curing step. This affords the advantage that a denser concavo-convex shape can be provided on the hard coat layer by peeling the mold substrate after curing the hard coat layer.

Antiglare Hard Coat Layer

In the method described above, the peel strength of the surface contact part between the concavo-convex shape surface of the mold substrate and the hard coat layer after the application of active energy rays is preferably in the range of 0.005 to 1.5 N/25 mm. The condition that the peel strength at the surface contact part between the cured hard coat layer and the mold substrate is within the above range affords the advantage that it is possible to peel off the mold substrate without destroying the concavo-convex shape formed on the surface of the hard coat layer.

Further, in the surface contact step between the concavo-convex shape surface of the mold substrate and the uncured hard coat layer surface in the above method, the concavo-convex shape transfer rate attained when the pressing pressure is 0.001 to 5 MPa is preferably 75 to 100%. In the surface contact step between the concavo-convex shape surface of the mold substrate and the uncured hard coat layer surface, when the pressing pressure is 0.001 to 5 MPa, the surface contact can be carried out without greatly reducing the thickness of the uncured hard coat layer. In the above method, it is preferable in the above method that the surface concavo-convex shape of the mold substrate can be transferred well to the surface of the hard coat layer as described above, more specifically, can be transferred at a concavo-convex shape transfer rate within the range of 75 to 100%, when the pressing pressure is 0.001 to 5 MPa.

In the present description, the concavo-convex shape transfer rate can be determined by the following procedure.

The $Rz_{JIS}(A)$ value of the mold substrate is measured. The concavo-convex shape surface of the mold substrate is brought into surface contact with the uncured hard coat layer surface by pressing with the pressing pressure being within the range of 0.001 to 5 MPa. The uncured hard coat layer is cured by applying active energy rays with the mold substrate being in surface contact. The mold substrate is peeled from the resulting hard coat layer, and then the $Rz_{JIS}(B)$ of the formed concavo-convex shape surface is measured. Using the $Rz_{JIS}(A)$ of the mold substrate and the $Rz_{JIS}(B)$ of the formed concavo-convex shape surface, the concavo-convex shape transfer rate can be determined from the following formula $(B)/(A) \times 100 (\%)$.

The antiglare hard coat layer preferably has a pencil hardness of 2H or higher. The pencil hardness can be measured in accordance with JIS K 5600-5-4. On the basis of the fact that the pencil hardness of the antiglare hard coat layer is 2H or more, the antiglare hard coat layer can be judged to be sufficiently high in hardness and have sufficient scratch resistance. The antiglare hard coat layer is characterized by having a fine concavo-convex shape and being high in hardness, that is, having a pencil hardness of 2H or higher. The pencil hardness of the antiglare hard coat layer is more preferably 3H or higher.

The antiglare hard coat layer preferably has a ten-point average roughness $Rz_{JIS}$ is of the surface concavo-convex shape of 0.2 to 1.0 μm. Here, the "ten-point average roughness $Rz_{JIS}$" is a kind of parameter that indicates the concavo-convex shape (roughness shape) of the surface defined in Appendix JA of JIS B0601; 2001. The ten-point average roughness $Rz_{JIS}$ is the sum of the average of the peak heights of from the first highest mountain peak (projection) to the fifth highest peak and the average of the valley depths of from the first deepest valley (recess) to the fifth deepest valley in a roughness curve with a reference length obtained by applying a cut-off value phase compensation band pass filter. The ten-point average roughness $Rz_{JIS}$ can be determined, for example, by using a laser microscope in accordance with the provision of JIS B0601; 2001.

In the antiglare hard coat layer, the average length RSm of the roughness curve element of the surface concavo-convex shape is preferably 5 μm to 100 μm. Here, the "average length RSm of the roughness curve element" is a kind of parameter that indicates the size and the distribution of the concavo-convex shape (roughness shape) of the surface defined in JIS B0601; 2001. The average length RSm of the roughness curve element means the average length of the contour curve (roughness curve) element at the reference length. The average length RSm of the roughness curve element is determined by using a laser microscope (for example, VK-8700 manufactured by KEYENCE Corporation) in accordance with the provision of JIS B0601; 2001.

With respect to the antiglare hard coat layer, it is preferable that in a transmitted image definition measurement test specified in JIS K7374 (2007), the sum total value Tc (%) of the respective transmitted image definitions Cn (%) for optical combs with five widths of 0.125 mm, 0.25 mm, 0.5 mm, 1.0 mm, and 2.0 mm be 300 or more. The sum total value Tc (%) is more preferably within the range of 300 to 480.

The transmitted image definition measurement test is a test in which the amount of light transmitted through the antiglare hard coat layer is measured through an optical comb with a width n (mm) that is perpendicular to the ray axis of the transmitted light and moves at a speed of 10 mm/min. Specifically, it is measured using an image clarity meter (manufactured by Suga Test Instruments Co., Ltd.). The image clarity meter is composed of an optical device in which parallel light rays passing through a slit are incident on an antiglare hard coat layer perpendicularly from the side opposite from the concavo-convex shape surface thereof and detects the transmitted light through a moving optical comb, and a measurement device for recording the detected fluctuation of the light quantity as a waveform. The optical combs have a width ratio of the bright part to the dark part of 1:1 and five widths n (mm) of 0.125, 0.25, 0.5, 1, and 2, and the moving speed thereof is adjusted to 10 mm/min.

The transmitted image definition Cn (%) is calculated from the following formula where the maximum value of the amount of transmitted light is expressed by Mn when there is a transmission portion (bright part) of the optical comb on the optical axis in the transmission image definition measurement test and the minimum value of the amount of transmitted light is expressed by mn when there is a light shield portion (dark part) of the optical comb on the ray axis.

$Cn=\{(Mn-mn)/(Mn+mn)\}\times 100$

The sum total value Tc (%) is defined as the sum total value of five transmitted image definitions C0.125(%), C0.25(%), C0.5(%), C1(%), and C2(%) attained when the optical comb width n (mm) is 0.125, 0.25, 0.5, 1, and 2, respectively, and the possible maximum value is 500%.

That the sum total value Tc (%) in the antiglare hard coat layer is 300 or more means that the antiglare hard coat layer has antiglare performance and further has high image definition and high image clarity. The fact that the antiglare hard coat layer has a high image definition affords the advantage that the layer exhibits an antiglare effect and concurrently fails to greatly reduce the image definition of a high-detail display, for example.

The antiglare hard coat layer preferably has a deviation of brightness variation on a 326 ppi display of 2.6% or less. The deviation can be determined by measuring the variation of the brightness value at a distance of 500 mm by using a 326 ppi display using an I16 device manufactured by RADIANT. The deviation can be calculated by numerically analyzing the brightness value obtained as described above using TrueTest as software. If the deviation in the antiglare hard coat layer is 2.6% or less, the occurrence of sparkling that reduces screen visibility is reduced, and the visibility can be judged to be good.

By forming the antiglare hard coat layer by the method described above, it is possible to form an antiglare hard coat layer having a fine concavo-convex shape on a surface thereof and having high hardness and superior scratch resistance.

Functional Layer

After the peeling step, a functional layer may be provided as necessary on the concavo-convex shape surface of the resulting antiglare hard coat layer. Examples of the functional layer include a high refractive index layer, a low refractive index layer, a multilayer including a low refractive index layer and a high refractive index layer, and an antifouling layer. These functional layers can be formed by a technique commonly used in this field, such as applying and curing a functional layer-forming coating composition.

Decorative Layer

On a transparent support substrate on which the antiglare hard coat layer described above is to be formed, a decorative layer may be formed as necessary. For example, the antiglare hard coat layer may be disposed on one side of the transparent support substrate, and the decorative layer may be disposed on the other side of the transparent support substrate. By disposing a decorative layer, the resultant can be used as a laminated member for molding decoration.

When a decorative layer is disposed, the antiglare hard coat layer may be disposed on one side of the transparent support substrate, and then the decorative layer may be disposed on the other side of the transparent support substrate. Moreover, when the active energy ray transmissibility of the decorative layer is high or when the active energy ray transmissibility of the mold substrate is high, the decorative layer may be disposed previously on one side of the transparent support substrate and then the antiglare hard coat layer may be provided on the other side.

The aforementioned decorative layer is a layer which affords decoration, such as a pattern, characters, or metallic luster. Examples of such a decorative layer include a printed layer or a vapor-deposited layer. Both the printed layer and the vapor-deposited layer are layers for decoration. In the present invention, either one of the printed layer and the vapor-deposited layer may be provided as the decorative layer, or both the printed layer and the vapor-deposited layer may be provided. The printed layer may be a layer composed of a plurality of layers. From the viewpoint of the easiness of a working process and the like, the decorative layer is preferably a printed layer.

The printed layer is a layer that decorates the surface of a molding with patterns and/or characters, or the like. Examples of the printed layer include patterns composed of woody textures, stone-like textures, cloth-like textures, sand-like textures, geometrical figures, characters, and whole solid. As the material for the printed layer, a colored ink may be used which contains resins such as polyvinyl-based resins including vinyl chloride/vinyl acetate-based copolymer, polyamide-based resins, polyester-based resins, polyacrylic resins, polyurethane-based resins, polyvinyl acetal-based resins, polyester urethane-based resins, cellulose ester-based resins, alkyd resins, and chlorinated polyolefin-based resins as a binder, and a pigment or dye with a suitable color as a coloring agent. As the pigment of the ink to be used for the printed layer, for example, the following can be used. Ordinarily, as the pigment, there can be used azo pigments such as polyazo, organic pigments such as isoindolinone, or inorganic pigments such as titanium nickel antimony oxide as a yellow pigment; azo pigments such as polyazo, organic pigments such as quinacridone, or inorganic pigments such as iron red as a red pigment; organic pigments such as phthalocyanine blue or inorganic pigments such as cobalt blue as a blue pigment; organic pigments such as aniline black as a black pigment; and inorganic pigments such as titanium dioxide as a white pigment.

As the dye of the ink to be used for the printed layer, various known dyes may be used to an extent not impairing the effect of the present invention. As the method of printing the ink, it is preferable to use a known printing method such as an offset printing method, a gravure printing method and a screen printing method or a known coating method such as a roll coating method or a spray coating method. At that time, when a low molecular weight crosslinking compound is not used, but a photocurable resin composition with a constitution where the polymers are crosslinked together is used as in the present invention, there is no surface tackiness, there is little trouble at the time of printing, and the yield is good.

The vapor-deposited layer can be formed by a vacuum vapor deposition method, a sputtering method, an ion plating method, a plating method, or the like using at least one metal selected from the group comprising aluminum, nickel, gold, platinum, chromium, iron, copper, indium, tin, silver, titanium, lead, zinc, etc., or an alloy or compound thereof.

The thickness of the printed layer or the vapor-deposited layer for decoration can be suitably chosen by a method ordinarily used depending on the degree of extension at the time of molding such that a desired surface appearance of a molding can be obtained.

Display

The transparent support substrate having the antiglare hard coat layer provided by the method described above can be used suitably as a member to be disposed in a display part. Examples of the display include a liquid crystal display, an organic EL display, and a plasma display. When the optical laminated member of the present invention is disposed in a display unit, the antiglare hard coat layer formed on one side of the transparent support substrate is arranged as an outer layer and the other side of the transparent support substrate or the decorative layer laminated on the other side of the transparent support substrate is arranged to face the surface of the display unit. Thereby, the antiglare hard coat layer is disposed on the surface side of the display.

A preferable example of the display is a touch panel display. It can be suitably used, for example, as an optical laminated member for in-vehicle device touch panel displays.

EXAMPLES

The present invention will be described hereafter in more detail by way of examples, to which the present invention is not intended to be limited. In the following examples, all designations of "part(s)" and "%" are on a mass basis, unless otherwise stated.

Preparation of Mold Substrate having Concavo-Convex Shape on its Surface

Production Example 1 Preparation of Unsaturated Double Bond-Containing Acrylic Copolymer A A mixture of 171.6 parts of isoboronyl methacrylate, 2.6 parts of methyl methacrylate and 9.2 parts of methacrylic acid was mixed. This mixed solution was added dropwise to 330.0 parts of methyl isobutyl ketone contained in a 1,000 ml reaction vessel equipped with a stirring blade, a nitrogen inlet tube, a cooling tube and a dropping funnel and having been heated to 110° C. under a nitrogen atmosphere, at a constant rate over 3 hours together with a solution containing 1.8 parts of tertiary butylperoxy-2-ethyl hexanoate in 80.0 parts of propylene glycol monomethyl ether, and then these were reacted at 110° C. for 30 minutes. Then, a solution containing 0.2 parts of tertiary butylperoxy-2-ethyl hexanoate in 17.0 parts of propylene glycol monomethyl ether was added dropwise, and a solution containing 1.4 parts of tetrabutylammonium bromide and 0.1 parts of hydroquinone in 5.0 parts of propylene glycol monomethyl ether was added. A solution of 22.4 parts of 4-hydroxybutyl acrylate glycidyl ether and 5.0 parts of propylene glycol monomethyl ether was added dropwise over 2 hours with air bubbling, followed by further reacting them over 5 hours. An unsaturated double bond-containing acrylic copolymer A having a weight-average molecular weight of 18,000 was obtained. This resin had an SP value of 10.0.

Production Example 2 Production of Concavo-Convex Shape-Forming Coating Composition 1

A vessel was charged with 37.5 parts of n-butanol, 24.88 parts of methyl ethyl ketone, 13.30 parts of ARONIX M-402 (manufactured by Toagosei Co., Ltd., dipentaerythritol penta and hexaacrylate, SP value: 12.1), 15.52 parts of Cyclomer ACA-Z320M (acrylic acrylate manufactured by Daicel Corporation, SP value: 11.49), 2.66 parts of CAP-482-20 (cellulose acetate manufactured by EASTMAN CHEMICAL, SP value: 8.70), and 1.42 parts of OMNIRAD 184 (photopolymerization initiator manufactured by IGM Resins, 1-hydroxycyclohexyl phenyl ketone), which were then mixed and stirred. Thereafter, 4.72 parts of unsaturated double bond-containing acrylic copolymer A was added with stirring to prepare concavo-convex shape-forming coating composition 1 such that the composition had a solid concentration of 25%.

Production Example 3 Preparation Example 1 of Mold Substrate Having Concavo-Convex Shape The concavo-convex-forming coating composition 1 was applied to a 100 µm thick PET film (trade name: A4300, manufactured by Toyobo Co., Ltd.) using a bar coater. After drying at 65° C. for 1 minute to volatilize the solvent, it was cured by UV irradiation treatment with an integrated dose of 1200 mJ/cm$^2$ under an N$_2$ atmosphere, and thus a 2 µm thick mold substrate 1 with an external Hz of 22.1% and an Rzjis of 0.51 µm having a concavo-convex shape was obtained.

Production Example 4 Preparation Example 2 of Mold Substrate Having Concavo-Convex Shape The concavo-convex-forming coating composition 1 was applied to a 100 µm thick PET film (trade name: A4300, manufactured by Toyobo Co., Ltd.) using a bar coater. After drying at 65° C. for 1 minute to volatilize the solvent, it was cured by UV irradiation treatment with an integrated dose of 2400 mJ/cm$^2$ under an N$_2$ atmosphere, and thus a 2 µm thick mold substrate 2 with an external Hz of 22.4% and an Rzjis of 0.48 µm having a concavo-convex shape was obtained.

Production Example 5 Preparation Example 3 of Mold Substrate Having Concavo-Convex Shape The concavo-convex-forming coating composition 1 was applied to a 100 µm thick PET film (trade name: A4300, manufactured by Toyobo Co., Ltd.) using a bar coater. After drying at 65° C. for 1 minute to volatilize the solvent, it was cured by UV irradiation treatment with an integrated dose of 600 mJ/cm$^2$ under an N$_2$ atmosphere, and thus a 2 µm thick mold substrate 3 with an external Hz of 21.8% and an Rzjis of 0.49 µm having a concavo-convex shape was obtained.

Production Example 6 Preparation Example 4 of Mold Substrate Having Concavo-Convex Shape The concavo-convex-forming coating composition 1 was applied to a 100 µm thick PET film (trade name: A4300, manufactured by Toyobo Co., Ltd.) using a bar coater. After drying at 65° C. for 1 minute to volatilize the solvent, it was cured by UV irradiation treatment with an integrated dose of 350 mJ/cm$^2$ under an N$_2$ atmosphere, and thus a 2 µm thick mold substrate 4 with an external Hz of 23.1% and an Rzjis of 0.49 µm having a concavo-convex shape was obtained.

Production Example 7 Production of Concavo-Convex Shape-Forming Coating Composition 2

A vessel was charged with 2.31 parts of methyl isobutyl ketone, 46.75 parts of isopropyl alcohol, 11.97 parts of ARONIX M-402 (manufactured by Toagosei Co., Ltd., SP value: 12.1), 9.98 parts of ARONIX M-305 (manufactured by Toagosei Co., Ltd., SP value: 12.7), 11.97 parts of ARONIX M-315 (manufactured by Toagosei Co., Ltd., SP value: 12.5), 5.99 parts of ARONIX M-220 (manufactured by Toagosei Co., Ltd., SP value: 12.2), and 2.54 parts of OMNIRAD 184 (manufactured by IGM Resins), which were then mixed and stirred. Thereafter, 8.49 parts of unsaturated double bond-containing acrylic copolymer A was added with stirring to prepare concavo-convex shape-forming coating composition 2 such that the composition had a solid concentration of 45%.

Production Example 8 Preparation Example 5 of Mold Substrate Having Concavo-Convex Shape The concavo-convex-forming coating composition 2 was applied to a 100 µm thick PET film (trade name: A4300, manufactured by Toyobo Co., Ltd.) using a bar coater. After drying at 80° C. for 1 minute to volatilize the solvent, it was cured by UV irradiation treatment with an integrated dose of 1200 mJ/cm$^2$ under an N$_2$ atmosphere, and thus a 2 μm thick mold substrate 5 with an external Hz of 6.5% and an Rzjis of 0.29 μm having a concavo-convex shape was obtained.

Production Example 9 Production of Concavo-Convex Shape-Forming Coating Composition 3

A vessel was charged with 42.5 parts of n-butanol, 14.94 parts of methyl ethyl ketone, 19.98 parts of ethyl acetate, 7.98 parts of ARONIX M-402 (manufactured by Toagosei Co., Ltd., SP value: 12.1), 9.32 parts of Cyclomer ACA-Z320M (manufactured by Daicel Corporation, SP value: 11.49), 1.60 parts of CAP-482-20 (manufactured by EASTMAN CHEMICAL, SP value: 8.70), and 0.85 parts of OMNIRAD 184 (manufactured by IGM Resins), which were then mixed and stirred. Then, 2.83 parts of unsaturated double bond-containing acrylic copolymer A was added with stirring to prepare concavo-convex-forming coating composition 3 such that the composition had a solid concentration of 15%.

Production Example 10 Preparation Example 6 of Mold Substrate Having Concavo-Convex Shape The concavo-convex-forming coating composition 3 was applied to a 100 μm thick PET film (trade name: A4300, manufactured by Toyobo Co., Ltd.) using a bar coater. After drying at 65° C. for 1 minute to volatilize the solvent, it was cured by UV irradiation treatment with an integrated dose of 1200 mJ/cm$^2$ under an N$_2$ atmosphere, and thus a 2 μm thick mold substrate 6 with an external Hz of 34.7% and an Rzjis of 0.80 μm having a concavo-convex shape was obtained.
Method for Forming Antiglare Hard Coat Layer Preparation Example 11 Preparation of Unsaturated Double Bond-Containing Acrylic Copolymer B A mixture consisting of 30.0 parts of 2,3-epoxypropyl methacrylate, 35.8 parts of methyl methacrylate, 34.2 parts of isobornyl methacrylate and 0.3 parts of tertiary butyl peroxy-2-ethylhexanoate was mixed. This mixed solution was added dropwise to 70.0 parts of toluene contained in a 500 ml reaction vessel equipped with a stirring blade, a nitrogen inlet tube, a cooling tube and a dropping funnel and having been heated to 110° C. under a nitrogen atmosphere, with stirring at a constant rate over 2 hours. After the completion of the dropwise addition, a reaction was performed for 1 hour under a temperature condition of 110° C. Then, a mixed solution of 1.0 part of tertiary butyl peroxy-2-ethylhexanoate and 25.0 parts of toluene was added dropwise over 1 hour. Then, the mixture was heated to 145° C. and further reacted for 2 hours, then cooled to 110° C. or lower, and 29.0 parts of toluene was added to obtain precursor B1.

A 500 ml reaction vessel equipped with a stirring blade, an air inlet tube, a cooling tube and a dropping funnel was charged with 225.3 parts of the precursor B1, 15.66 parts of acrylic acid, 0.43 parts of hydroquinone monomethyl ether, and 56 parts of toluene, which were then heated to 90° C. with blowing air and stirring. Under a temperature condition of 90° C., a mixed solution of 3.0 parts of toluene and 0.81 parts of tetrabutylammonium bromide was added and reacted for 1 hour. Then, the reaction liquid was heated to 105° C., and it was reacted under a temperature condition of 105° C. while monitoring the acid value of the solid in the reaction liquid and until the acid value became 8 or less. The acid value was determined in accordance with JIS K5601-2-1; the above reaction liquid was titrated with a 0.1 N potassium hydroxide (KOH) solution, and the acid value was calculated according to the following equation:

Acid value={(the amount [ml] of the dropped KOH solution)×(the molar concentration [mol/L] of the KOH solution)}/(the mass [g] of the solid)

Then, a mixed solution of 0.43 parts of hydroquinone monomethyl ether and 3.0 parts of toluene was added, the temperature was adjusted to 75° C. and a mixed solution of 10.1 parts of Karenz MOI (manufactured by Showa Denko K.K.), 5.0 parts of toluene and 0.043 parts of dibutyltin dilaurate, and then a reaction was carried out under a temperature condition of 70° C. for 2 hours, followed by cooling to 60° C. or lower and adding a mixed solution of 2.0 parts of methanol and 10.0 parts of toluene, so that unsaturated double bond-containing acrylic copolymer B having a weight-average molecular weight of 350000 was obtained.

Example 1

Method for Producing Hard Coating Composition 1

A vessel was charged with 29.84 parts of propylene glycol monomethyl ether, 13.9 parts of ethyl acetate, 13.9 parts of butyl acetate, 27.8 parts of KRM-8452 (manufactured by Daicel Corporation, polymerizable unsaturated group-containing urethane (meth)acrylate oligomer or polymer), 0.98 parts of OMNIRAD 184 (manufactured by IGM Resins, photopolymerization initiator, 1-hydroxycyclohexyl phenyl ketone), L31 parts of OMNIRAD TPO (manufactured by IGM Resins, photopolymerization initiator, 2,4,6-trimethylbenzoyldiphenylphosphine oxide), and 12.27 parts of MIBK-AC-2140Z (manufactured by Nissan Chemical Corporation, reactive colloidal silica, methyl isobutyl ketone dispersion having a nonvolatile component content: 40% by mass), which were then mixed and stirred, and hard coating composition 1 was prepared such that the composition had a solid concentration of 35%.
Method for Producing Antiglare Hard Coat Layer The hard coating composition 1 was applied to one side of a 1.0 mm thick three-layer (PMMA/PC/PMMA) sheet (trade name: MT3LTR, manufactured by Kuraray Co., Ltd.) made of PMMA (polymethyl methacrylate) and PC (polycarbonate) with a bar coater to achieve a dry film thickness of 6 μm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 2

Method for Producing Hard Coating Composition 2

A vessel was charged with 29.84 parts of propylene glycol monomethyl ether, 7.94 parts of ethyl acetate, 7.95 parts of butyl acetate, 39.72 parts of Art-Resin UN-905 (manufactured by Negami Chemical Industrial Co., Ltd., polymerizable unsaturated group-containing urethane (meth)acrylate oligomer or polymer), 0.98 parts of OMNIRAD 184 (manufactured by IGM Resins), 1.31 parts of OMNIRAD TPO (manufactured by IGM Resins), and 12.27 parts of MIBK-AC-2140Z (manufactured by Nissan Chemical Corporation), which were then mixed and stirred, and hard coating composition 2 was prepared such that the composition had a solid concentration of 35%.

Method for Producing Antiglare Hard Coat Layer

The hard coating composition 2 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 3

Method for Producing Hard Coating Composition 3

A vessel was charged with 29.84 parts of propylene glycol monomethyl ether, 11.12 parts of ethyl acetate, 11.12 parts of butyl acetate, 22.24 parts of KRM-8452 (manufactured by Daicel Corporation), 11.12 parts of UNIDIC V-6850 (manufactured by DIC Corporation, polymerizable unsaturated group-containing acrylic (meth)acrylate oligomer or polymer), 0.98 parts of OMNIRAD 184 (manufactured by IGM Resins), 1.31 parts of OMNIRAD TPO (manufactured by IGM Resins), and 12.27 parts of MIBK-AC-2140Z (manufactured by Nissan Chemical Corporation), which were then mixed and stirred, and hard coating composition 3 was prepared such that the composition had a solid concentration of 35%.

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 4

Method for Producing Hard Coating Composition 4

A vessel was charged with 29.84 parts of propylene glycol monomethyl ether, 9.73 parts of ethyl acetate, 9.73 parts of butyl acetate, 19.46 parts of KRM-8452 (manufactured by Daicel Corporation), 16.68 parts of UNIDIC V-6850 (manufactured by DIC Corporation), 0.98 parts of OMNIRAD 184 (manufactured by IGM Resins), 1.31 parts of OMNIRAD TPO (manufactured by IGM Resins), and 12.27 parts of MIBK-AC-2140Z (manufactured by Nissan Chemical Corporation), which were then mixed and stirred, and hard coating composition 4 was prepared such that the composition had a solid concentration of 35%.

Method for Producing Antiglare Hard Coat Layer

The hard coating composition 4 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 5

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 2, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 6

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 3, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 7

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 4, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 8

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.006 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 9

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 2.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 10

Method for Producing Hard Coating Composition 5

A vessel was charged with 29.84 parts of propylene glycol monomethyl ether, 11.1 parts of ethyl acetate, 11.1 parts of butyl acetate, 11.12 parts of UNIDIC V-6850 (manufactured by DIC Corporation), 22.24 parts of ARONIX M-402 (manufactured by Toagosei Co., Ltd.), 0.98 parts of OMNIRAD 184 (manufactured by IGM Resins), 1.31 parts of OMNIRAD TPO (manufactured by IGM Resins), and 12.27 parts of MIBK-AC-2140Z (manufactured by Nissan Chemical Corporation), which were then mixed and stirred, and hard coating composition 5 was prepared such that the composition had a solid concentration of 35%.

Method for Producing Antiglare Hard Coat Layer

The hard coating composition 5 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 11

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 5, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 12

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 6, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Example 13

Method for Producing Functional Layer Composition 1

A vessel was charged with 912.7 parts of propylene glycol monomethyl ether, 5.36 parts of ARONIX M-402 (manufactured by Toagosei Co., Ltd.), 8.04 parts of Art-Resin UN-906S (urethane acrylate manufactured by Negami Chemical Industrial Co., Ltd.), 1.88 parts of OMNIRAD 127 (manufactured by IGM Resins), and 6.70 parts of OPTOOL DAC-HP (manufactured by Daikin Industries, Ltd., fluorine-based additive), which were then mixed and stirred. While stirring, 65.33 parts of THRULYA 4320 (manufactured by JGC Catalysts and Chemicals Ltd.) was added, so that functional layer composition 1 was prepared such that the composition had a solid concentration of 3%.

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex shape surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 120 mJ/cm$^2$ and then the mold substrate surface was peeled off, so that an antiglare hard coat layer having concavo-convex shape on the surface thereof was obtained.

The functional layer composition 1 described above was applied to the concavo-convex-forming surface of the resulting antiglare hard coat layer with a bar coater to achieve a dry film thickness of 80 nm, and then the composition was dried at 65° C. for 1 minute to volatilize the solvent.

Then, it was cured by a UV irradiation treatment with an integrated dose of 1500 mJ/cm$^2$ in an N$_2$ atmosphere, so that an antiglare hard coat layer with a functional layer laminated thereon was obtained.

Example 14

Method for Producing Hard Coating Composition 6

A vessel was charged with 7.36 parts of methyl isobutyl ketone, 29.84 parts of propylene glycol monomethyl ether, 10.70 parts of ethyl acetate, 10.71 parts of butyl acetate, 25.57 parts of KRM-8452 (manufactured by Daicel Corporation), 12.79 parts of UNIDIC V-6850 (manufactured by DIC Corporation), 0.95 parts of OMNIRAD 184 (manufactured by IGM Resins), 1.28 parts of OMNIRAD TPO (manufactured by IGM Resins), and 0.80 parts of Techpolymer SSX-302ABE (manufactured by Sekisui Plastics Co., Ltd., refractive index: 1.595), which were then mixed and stirred, and hard coating composition 6 was prepared such that the composition had a solid concentration of 35%. The refractive index of the cured film containing only the binder resin was 1.51.

The refractive index of the layer-forming resin component film contained in the hard coating composition was measured using an Abbe refractometer by a method in accordance with JIS K0062.

In the measurement of light transmissive fine particles, three points differing in the amount of the light transmissive fine particles added were prepared in a layer-forming resin component film contained in the hard coating composition and the respective cured films were prepared, and then the respective refractive indexes were measured using an Abbe refractometer. The refractive index of the light transmissive fine particles was calculated from the calibration curve.

Method for Producing Antiglare Hard Coat Layer

The hard coating composition 6 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Comparative Example 1

Method for Producing Hard Coating Composition 7

A vessel was charged with 23.66 parts of propylene glycol monomethyl ether, 6L79 parts of unsaturated double bond-containing acrylic copolymer B, 0.98 parts of OMNIRAD 184 (manufactured by IGM Resins), 1.31 parts of OMNIRAD TPO (manufactured by IGM Resins), and 12.27 parts of MIBK-AC-2140Z (manufactured by Nissan Chemical Corporation), which were then mixed and stirred, and hard coating composition 7 was prepared such that the composition had a solid concentration of 35%.

Method for Producing Antiglare Hard Coat Layer

The hard coating composition 7 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Comparative Example 2

Method for Producing Hard Coating Composition 8

A vessel was charged with 29.84 parts of propylene glycol monomethyl ether, 13.9 parts of ethyl acetate, 13.9 parts of butyl acetate, 27.8 parts of ARONIX M-305 (pentaerythritol tri and tetraacrylate manufactured by Toagosei Co., Ltd.), 0.98 parts of OMNIRAD 184 (manufactured by IGM Resins), 1.31 parts of OMNIRAD TPO (manufactured by IGM Resins), and 12.27 parts of MIBK-AC-2140Z (manufactured by Nissan Chemical Corporation), which were then mixed and stirred, and hard coating composition 8 was prepared such that the composition had a solid concentration of 35%.

Method for Producing Antiglare Hard Coat Layer

The hard coating composition 8 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 µm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm$^2$ and then the mold substrate surface was peeled off, so that an antiglare hard coat layer was obtained.

Comparative Example 3

Method for Producing Antiglare Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 μm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressure of 0.0005 MPa, and curing was carried out by a UV irradiation treatment from the mold substrate surface side with an integrated dose of 1100 mJ/cm² and then the mold substrate surface was peeled off, so that an antiglare hard coat layer was obtained.

Comparative Example 4

Method for Producing Hard Coat Layer

The hard coating composition 3 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 μm, and then the composition was dried at 65° C. for 4 minutes to volatilize the solvent, and was cured by a UV irradiation treatment with an integrated dose of 1100 mJ/cm² under a nitrogen atmosphere and then the mold substrate surface was peeled off, so that a hard coat layer was obtained.

Comparative Example 5

Method for Producing Hard Coat Layer

The concavo-convex-forming composition 1 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 2 μm, and then the composition was dried at 65° C. for 4 minutes to volatilize the solvent and was cured by a UV irradiation treatment with an integrated dose of 1200 mJ/cm² under a nitrogen atmosphere and then the mold substrate surface was peeled off, so that a hard coat layer was obtained.

Comparative Example 6

A hard coat layer was obtained in the same procedure as in Example 3, except that in the production of an antiglare hard coat layer, the hard coating composition 3 was applied and dried, then the concavo-convex surface of the mold substrate 1 was bonded, then the mold substrate was peeled off without applying UV light, and UV irradiation was performed after the peeling.

Comparative Example 7

Method for Producing Hard Coating Composition 9

A vessel was charged with 29.84 parts of propylene glycol monomethyl ether, 13.9 parts of ethyl acetate, 13.9 parts of butyl acetate, 27.8 parts of ARONIX M-315 (isocyanuric acid EO-modified di and triacrylate manufactured by Toagosei Co., Ltd.), 0.98 parts of OMNIRAD 184 (manufactured by IGM Resins), 1.31 parts of OMNIRAD TPO (manufactured by IGM Resins), and 12.27 parts of MIBK-AC-2140Z (manufactured by Nissan Chemical Corporation), which were then mixed and stirred, and hard coating composition 9 was prepared such that the composition had a solid concentration of 35%.

Method for Producing Antiglare Hard Coat Layer

The hard coating composition 9 was applied to one side of a 1.0 mm thick three-layer (PMMA/PC/PMMA) sheet (trade name: MT3LTR, manufactured by Kuraray Co., Ltd.) made of PMMA and PC with a bar coater to achieve a dry film thickness of 6 μm, and then the composition was dried at 65° C. for 4 minutes to volatilize the solvent. Then, the hard coating surface and the concavo-convex surface of the mold substrate of Preparation Example 1, which was a mold substrate having a concavo-convex shape were bonded together with a laminating machine at a pressing pressure of 0.5 MPa, and curing was carried out by a UV irradiation treatment from the mold substrate surface side with an integrated dose of 1100 mJ/cm². Then, an attempt was made to peel off the mold substrate surface, but it was not possible to peel off the surface and no antiglare hard coat layer was obtained.

The following evaluations were carried out using the antiglare hard coat layers obtained in the above Examples and Comparative Examples. The results of the evaluations are shown in the following tables.

Calculation of Film Thickness

The film thickness was measured as follows.

A test sample was cut into a size of 10 mm×10 mm, and a cross section of the coating film was precipitated with a microtome (LEICA RM 2265). The precipitated cross section was observed with a laser microscope (VK8700 manufactured by KEYENCE Corporation), the film thickness was measured at ten recessing portions and ten protruding portions, and the average value of the measurements was calculated to determine the film thickness.

Method for Measuring Pressing Pressure During Surface Contact

A Prescale (manufactured by FUJIFILM Corporation) was placed on the transparent support substrate, and the pressing pressure of the laminating machine was measured.

Measurement of Peel Strength before and after Curing

The mold substrate, the transparent support substrate and the antiglare hard coat layer were cut into a size of a width of 25 mm and a length of 200 mm, and strength attained when one end of the mold substrate was peeled at 180 degrees at a constant speed of 300 mm/min at 23° C. and 50 RH % was measured.

Visual Appearance Evaluation

A test sample of an antiglare hard coat layer was placed under a fluorescent lamp, and the surface layer of the antiglare hard coat layer was visually checked.

The evaluation criteria for the appearance after bonding are as follows.

◯: No bumps, dents, steps, or squeeze out of the coating film were visually recognized on the film after bonding.

x: Bumps, dents, steps, or squeeze out of the coating film were visually recognized on the film after bonding.

The evaluation criteria for the appearance after peeling are as follows.

◯: Concavo-convex appearance was uniformly imparted to the front surface, and no steps and squeeze out of the coating film were visually recognized.

x: Clear parts without concavo-convex appearance, steps, or squeeze out of the coating film were visually recognized.

Measurement of ten-point average roughness $Rz_{JIS}$ of surface of antiglare hard coat layer A test sample of an antiglare hard coat layer was cut into a size of 50 mm×50 mm and measured in accordance with JIS B0601;2001 with a laser microscope (VK8700 manufactured by KEYENCE Corporation) having an eyepiece magnification of 20 times and an objective lens magnification of 50 times, and thus an $Rz_{JIS}$ value was obtained.

Concavo-Convex Shape Transfer Rate

The concavo-convex shape transfer rate in a test sample of an antiglare hard coat layer was determined in the following procedure.

First, the $Rz_{JIS}$ (A) value of a mold substrate was measured by the same procedure as described above. The concavo-convex shape surface of the mold substrate was brought into surface contact with the uncured hard coat layer surface by pressing at a pressure within the range of 0.001 to 5 MPa, and UV rays were applied with an irradiated dose of 1100 mJ/cm$^2$ with the mold substrate being in surface contact, so that the uncured hard coat layer was cured. The mold substrate was peeled off from the resulting hard coat layer, and the $Rz_{JIS}$(B) of the formed concavo-convex shape surface was measured. Using the $Rz_{JIS}$(A) of the mold substrate and the $Rz_{JIS}$(B) of the formed concavo-convex shape surface, a concavo-convex shape transfer rate was determined from the following formula: (B)/(A)×100(%).

Measurement of Haze Value of Antiglare Hard Coat Layer

The haze value (total haze value) Ha of an antiglare hard coat layer was measured by the method in accordance with JIS K7136 using a haze meter (NDH2000 manufactured by Nippon Denshoku Industries Co., Ltd.).

Measurement of Total Light Transmittance of Antiglare Hard Coat Layer

The incident light intensity (T0) to an antiglare hard coat layer and the total transmitted light intensity (T1) transmitted through the antiglare hard coat layer were measured, and then the total light transmittance (Tt (%)) of the antiglare hard coat layer was calculated by the following formula.

$$Tt(\%)=T1/T0\times100$$

Measurement of Average Length RSm of Roughness Curve Element of Surface of Antiglare Hard Coat Layer The average length RSm of the roughness curve element on a surface of an antiglare hard coat layer was measured in accordance with JIS B0601;2001 using a laser microscope (VK-8700 manufactured by KEYENCE Corporation, or the like).

Evaluation of Image Clarity of Antiglare Hard Coat Layer

The quantity of the light transmitted through an antiglare hard coat layer was measured by using an image clarity meter ICM-1T (manufactured by Suga Test Instruments Co., Ltd.) through an optical comb with a width of n (mm) that was perpendicular to the ray axis of transmitted light and moved at a speed of 10 mm/min. The optical comb had a width ratio of the bright part to the dark part of 1:1 and five widths n (mm) of 0.125, 0.25, 0.5, 1, and 2, and the moving speed thereof was adjusted to 10 mm/min.

The transmitted image definition Cn (%) was calculated from the following formula where the maximum value of the amount of transmitted light was expressed by Mn when there was a transmission portion (bright part) of the optical comb on the optical axis in the transmission image definition measurement test and the minimum value of the amount of transmitted light was expressed by mn when there was a light shield portion (dark part) of the optical comb on the ray axis.

$$Cn=\{(Mn-mn)/(Mn+mn)\}\times100$$

Next, a sum total value Tc (%) was calculated. The sum total value Tc (%) is a sum total value of five transmitted image definitions C0.125(%), C0.25(%), C0.5(%), C1(%), and C2(%) measured when the optical comb width n (mm) is 0.125, 0.25, 0.5, 1, and 2, respectively (the maximum of the sum total value that can be taken is 500%).

Measurement of Pencil Hardness

According to JIS K 5600-5-4, the pencil hardness of a coating film was measured.

Specifically, the measurement was carried out by using a pencil scratch applied-film hardness tester (manufactured by Toyo Seiki Seisaku-sho, Ltd., model P, pressing load: 100 g to 1 kg).

Using a pencil for pencil scratch test (inspected by Japan Paint Inspection and testing Association) manufactured by Mitsubishi Uni, the tip of the core thereof was adjusted with abrasive paper (3M P-1000) such that the tip would have a smooth circular section. After setting a sample on a measuring table, the pencil was fixed to have a scratch angle of 45°, and a test was conducted under a load of 750 g. For each test, the test was repeated five times with the test site shifted while smoothing the core. The presence or absence of recesses on the surface of the coating film was visually checked.

For example, in a test using a 3H pencil, when there was no generation of scratches, this was judged as 3H or more. When slight generation of dents was visually recognized in one test of the five tests, this was judged as 3H. When there was generation of dents in two or more tests of the five tests, this was judged as less than 3H, and evaluation lowered by one grade was carried out in the same manner.

When the pencil hardness is less than 3H, the hardness and the scratch resistance can be judged as being poor.

Scratch Resistance Test

A scratch resistance test was carried out by the surface of an antiglare hard coat layer was reciprocated 10 times with steel wool #0000 under a load of 2N or 4N per 2 cm$^2$.

The surface of the sample after the scratch resistance test was observed with a microscope with a magnification of 100 times (Digital Microscope VHX-2000, lens: Z2100, manufactured by KEYENCE CORPORATION) and was judged in the field of view of the microscope based on the following criteria.

⊙: No scratches having a length of 500 μm or more were visually recognized under a load of 4 N per 2 cm$^2$.

○: No scratches having a length of 500 μm or more were visually recognized under a load of 2 N per 2 cm$^2$.

Δ: At least 1 to 5 scratches having a length of 500 μm or more were visually recognized under a load of 2 N per 2 cm$^2$.

x: Many scratches having a length of 500 μm or more were visually recognized under a load of 2 N per 2 cm$^2$.

Sparkling Property Evaluation

The test sample of the antiglare hard coat layer was visually evaluated based on the following evaluation criteria using a display having a pixel density of 326 ppi.

⊙: Sparkling was hardly recognized and the glare property was good.

○: Slight sparkling was recognized, but the glare property was good.

Δ: Sparkling was recognized and the glare property was poor.

x: Sparkling was clearly recognized and the glare property was poor.

Antiglare Property Evaluation

A specimen was prepared by bonding a black PET film (manufactured by PANAC Co., Ltd., trade name: Gelpoly GPH100E82A04) and a test sample of an antiglare coating layer.

The specimen was placed under a fluorescent lamp, and the degree of reflection of the fluorescent lamp was visually checked. Evaluation criteria are as follows.
- ◯: The contour of the reflected fluorescent lamp was distorted.
- Δ: The contour of the reflected fluorescent lamp was slightly distorted.
- x: The contour of the reflected fluorescent lamp was recognized.

The external haze value (external Hz) of a mold substrate was measured according to the following procedure.

The haze value (total haze value) of the mold substrate and the total haze value Ha of the mold substrate were measured by a method in accordance with JIS K7136 using a haze meter (NDH 2000, manufactured by Nippon Denshoku Industries Co., Ltd.).

A test sample of the mold substrate was cut into 50 mm×50 mm. 0.01 ml of glycerin (special grade reagent, manufactured by Kishida Chemical Co., Ltd.) was dropped onto a concavo-convex surface of the coating film of the test sample, and then a glass plate (18 mm×18 mm, produced by Matsunami Glass Ind., Ltd.) was placed thereon to prepare a test piece with surface irregularities crushed. Using the haze meter, the internal haze value Hi of the mold substrate was measured by a method in accordance with JIS K7136.

The external haze value H was measured from the following equation.

$$External\ haze\ value\ H = Ha - Hi$$

Of the evaluation items of the antiglare hard coat layer of Example 13 provided with a functional layer, the items of "$Rz_{JIS}$" and "concavo-convex shape transfer rate" are items evaluated in a state before the functional layer was disposed, and the other items were evaluated in a state after the functional layer was disposed.

TABLE 1

| | | | Example 1 | Example 2 | Example 3 | Example 4 | Example 5 | Example 6 | Example 7 |
|---|---|---|---|---|---|---|---|---|---|
| Mold substrate Composition resin ratio | No. of mold substrate | | Mold substrate 1 | Mold substrate 1 | Mold substrate 1 | Mold substrate 1 | Mold substrate 2 | Mold substrate 3 | Mold substrate 4 |
| | ARONIX M-402 | | 56.4 | 56.4 | 56.4 | 56.4 | 56.4 | 56.4 | 56.4 |
| | ARONIX M-305 | | — | — | — | — | — | — | — |
| | ARONIX M-315 | | — | — | — | — | — | — | — |
| | ARONIX M-220 | | — | — | — | — | — | — | — |
| | CYCLOMER ACA-Z320M | | 26.32 | 26.32 | 26.32 | 26.32 | 26.32 | 26.32 | 26.32 |
| | Unsaturated double bond-containing acrylic copolymer A | | 6 | 6 | 6 | 6 | 6 | 6 | 6 |
| | CAP-482-20 | | 11.28 | 11.28 | 11.28 | 11.28 | 11.28 | 11.28 | 11.28 |
| Hard coating composition resin ratio | Hard coating composition No. | | Composition 1 | Composition 2 | Composition 3 | Composition 4 | Composition 3 | Composition 3 | Composition 3 |
| | Polymerizable unsaturated group-containing oligomer polymer | KRM 8452 Mw: 2000 | 100 | | 80 | 70 | 80 | 80 | 80 |
| | | UNIDIC Art-Resin UN-905 (Mw: 30000) | | | | | | | |
| | | Unsaturated double bond-containing acrylic copolymer Mw: 105000 | | 100 | | | | | |
| | | Unsaturated double bond-containing acrylic copolymer Mw: 350000 | | | | | | | |
| | Polymerizable unsaturated group-containing monomer | ARONIX M-402 Unsaturated group equivalent: 99 | | | 20 | 30 | 20 | 20 | 20 |
| | | ARONIX M-305 Unsaturated group equivalent: 99 | | | | | | | |
| | | ARONIX M-315 Unsaturated group equivalent: 141 | | | | | | | |
| Bonding | Pressing pressure [MPa] | | 0.5 | 0.5 | 0.5 | 0.5 | 0.5 | 0.5 | 0.5 |
| | Peel strength before curing [N/25 mm] | | 0.029 | 0.079 | 0.421 | 1.415 | 0.422 | 0.372 | 0.482 |
| | Peel strength after curing [N/25 mm] | | 0.104 | 0.035 | 0.028 | 0.043 | 0.011 | 0.22 | 1.119 |
| | Appearance | Appearance after bonding | ○ | ○ | ○ | ○ | ○ | ○ | ○ |
| | | Appearance after peeling | ○ | ○ | ○ | ○ | ○ | ○ | ○ |
| Antiglare hard coat layer | $Rz_{JIS}$ | | 0.48 | 0.49 | 0.50 | 0.48 | 0.46 | 0.45 | 0.47 |
| | Concavo-convex shape transfer rate | | 94.1 | 96.1 | 98.0 | 94.1 | 95.8 | 91.8 | 95.9 |
| | Haze value | | 21.6 | 20.8 | 21.4 | 18.7 | 22.2 | 21.8 | 22.2 |
| | Total light transmittance | | 91.3 | 91.3 | 91.2 | 91.3 | 91.1 | 91.0 | 91.1 |
| | Sm | | 19 | 21 | 22 | 25 | 19 | 16 | 0.47 |
| | Image clarity transmission | | 385 | 390 | 388 | 406 | 390 | 393 | 384 |
| | Pencil hardness | | 4H | 4H | 4H | 4H | 4H | 4H | 4H |
| | Scratch resistance | | ⊚ | ⊚ | ⊚ | ⊚ | ⊚ | ⊚ | ⊚ |
| | Glare property | | ○○ | ○○ | ○○ | ○○ | ○○ | ○○ | ○○ |
| | Antiglare property | | ○ | ○ | ○ | ○ | ○ | ○ | ○ |

TABLE 2

| | | Example 8 | Example 9 | Example 10 | Example 11 | Example 12 | Example 13 | Example 14 |
|---|---|---|---|---|---|---|---|---|
| Mold substrate | No. of mold substrate | Mold substrate 1 | Mold substrate 1 | Mold substrate 1 | Mold substrate 5 | Mold substrate 6 | Mold substrate 1 | Mold substrate 1 |
| Composition resin ratio | ARONIX M-402 | 56.4 | 56.4 | 56.4 | 28.2 | 56.4 | 56.4 | 56.4 |
| | ARONIX M-305 | — | — | — | 23.5 | — | — | — |
| | ARONIX M-315 | — | — | — | 28.2 | — | — | — |
| | ARONIX M-220 | — | — | — | 14.1 | — | — | — |
| | CYCLOMER ACA-Z320M | 26.32 | 26.32 | 26.32 | | 26.32 | 26.32 | 26.32 |
| | Unsaturated double bond-containing acrylic copolymer A | 6 | 6 | 6 | 6.0 | 6 | 6 | 6 |
| | CAP-482-20 | 11.28 | 11.28 | 11.28 | | 11.28 | 11.28 | 11.28 |
| Hard coating composition | Hard coating composition No. | Composition 3 | Composition 3 | Composition 5 | Composition 3 | Composition 3 | Composition 3 | Composition 6 |
| resin ratio | Polymerizable unsaturated group-containing oligomer | KRM 8452 | 80 | 80 | | 80 | 80 | 80 | 80 |
| | UNIDIC Art-Resin UN-905 (Mw: 30000) | | | | | | | |
| | Unsaturated double bond-containing acrylic copolymer polymer (Mw: 105000) | | | | | | | |
| | Unsaturated double bond-containing acrylic copolymer (Mw: 350000) | | | 80 | | | | |
| | Polymerizable unsaturated group-containing monomer | ARONIX M-402 Unsaturated group equivalent: 99 | 20 | 20 | 20 | | 20 | 20 | 20 |
| | ARONIX M-305 Unsaturated group equivalent: 99 | | | | 20 | | | |
| | ARONIX M-315 Unsaturated group equivalent: 141 | | | | | | | |
| Bonding | Pressing pressure [MPa] | 0.006 | 2.5 | 0.5 | 0.5 | 0.5 | 0.5 | 0.5 |
| | Peel strength before curing [N/25 mm] | 0.375 | 0.38 | 0.175 | 0.410 | 0.380 | 0.385 | 0.392 |
| | Peel strength after curing [N/25 mm] | 0.038 | 0.068 | 0.096 | 0.021 | 0.019 | 0.015 | 0.031 |
| | Appearance after bonding | ○ | ○ | ○ | ○ | ○ | ○ | ○ |
| | Appearance after peeling | ○ | ○ | ○ | ○ | ○ | ○ | ○ |
| Antiglare hard coat layer | $Rz_{JIS}$ | 0.51 | 0.49 | 0.49 | 0.28 | 0.79 | 0.49 | 0.43 |
| | Concavo-convex shape transfer rate | 100.0 | 96.1 | 96.1 | 96.6 | 98.8 | 96.1 | 84.3 |
| | Haze value | 21.9 | 21.8 | 22.0 | 5.7 | 33.9 | 7.8 | 28.1 |
| | Total light transmittance | 91.1 | 90.9 | 91.1 | 91.2 | 90.8 | 92.5 | 90.3 |
| | Image clarity transmission Sm | 20 | 19 | 18 | 35 | 29 | 27 | 15 |
| | | 380 | 385 | 390 | 405 | 353 | 435 | 330 |
| | Pencil hardness | 4H | 4H | 4H | 4H | 4H | 4H | 4H |
| | Scratch resistance | ⊙ | ⊙ | ⊙ | ⊙ | ⊙ | ○ | ○ |
| | Glare property | ○ | ○ | ○ | ○ | ⊙ | ○ | ○ |
| | Antiglare property | ○ | ○ | ○ | ○ | ⊙ | △ | ○ |

TABLE 3

|  |  |  |  | Comparative Example 1 | Comparative Example 2 | Comparative Example 3 | Comparative Example 4 |
|---|---|---|---|---|---|---|---|
| Mold substrate Composition resin ratio | | No. of mold substrate | | Mold substrate 1 | Mold substrate 1 | Mold substrate 1 | — |
| | | ARONIX M-402 | | 56.4 | 56.4 | 56.4 | |
| | | ARONIX M-305 | | — | — | — | |
| | | ARONIX M-315 | | — | — | — | |
| | | ARONIX M-220 | | — | — | — | |
| | | CYCLOMER ACA-Z320M | | 26.32 | 26.32 | 26.32 | |
| | | Unsaturated double bond-containing acrylic copolymer A | | 6 | 6 | 6 | |
| | | CAP-482-20 | | 11.28 | 11.28 | 11.28 | |
| Hard coating composition resin ratio | | Hard coating composition No. | | Composition 7 | Composition 8 | Composition 3 | Composition 3 |
| | Polymerizable unsaturated group-containing oligomer polymer | KRM 8452 | Mw: 2000 | | | 80 | 80 |
| | | UNIDIC | (Mw: 30000) | | | 20 | 20 |
| | | Art-Resin UN-905 | Mw: 105000 | | | | |
| | | Unsaturated double bond-containing acrylic copolymer | Mw: 350000 | 100 | | | |
| | Polymerizable unsaturated group-containing monomer | ARONIX M-402 | Unsaturated group equivalent: 99 | | | | |
| | | ARONIX M-305 | Unsaturated group equivalent: 99 | | 100 | | |
| | | ARONIX M-315 | Unsaturated group equivalent: 141 | | | | |
| Bonding | | Pressing pressure [MPa] | | 0.5 | 0.5 | 0.0005 | — |
| | | Peel strength before curing [N/25 mm] | | 0.005 | 0.005 | 0.24 | |
| | | Peel strength after curing [N/25 mm] | | — | — | 0.035 | |
| Antiglare hard coat layer | | Appearance | Appearance after bonding | X (Lifting was observed.) | X (Squeeze out of edge of coating film) | X (Lifting was observed.) | — |
| | | | Appearance after peeling | X (Lifting portion is not transferable.) | — | X (Lifting portion is not transferable.) | — |
| | | $Rz_{JIS}$ | | 0.04-0.19 | | 0.05-0.48 | 0.05 |
| | | Concavo-convex shape transfer rate | | 7.8-37.3 | | 9.8-94.1 | — |
| | | Haze value | | | | | 0.07 |
| | | Total light transmittance | | | | | 91.2 |
| | | Sm | | | | | Not measurable |
| | | Image clarity transmission | | | | | 482 |
| | | Pencil hardness | | | | | 4H |
| | | Scratch resistance | | | | | ○ |
| | | Glare property | | | | | ○ |
| | | Antiglare property | | | | | X |

|  |  |  |  | Comparative Example 5 | Comparative Example 6 | Comparative Example 7 |
|---|---|---|---|---|---|---|
| Mold substrate Composition resin ratio | | No. of mold substrate | | — | Mold substrate 1 | Mold substrate 1 |
| | | ARONIX M-402 | | | 56.4 | 56.4 |
| | | ARONIX M-305 | | | — | — |
| | | ARONIX M-315 | | | — | — |
| | | ARONIX M-220 | | | — | — |
| | | CYCLOMER ACA-Z320M | | | 26.32 | 26.32 |
| | | Unsaturated double bond-containing acrylic copolymer A | | | 6 | 6 |
| | | CAP-482-20 | | | 11.28 | 11.28 |
| Hard coating composition resin ratio | | Hard coating composition No. | | Preparation Example 1 of mold substrate | Composition 3 | Composition 9 |
| | Polymerizable unsaturated group-containing oligomer polymer | KRM 8452 | Mw: 2000 | | 80 | |
| | | UNIDIC | (Mw: 30000) | | 20 | |
| | | Art-Resin UN-905 | Mw: 105000 | | | |
| | | Unsaturated double bond-containing acrylic copolymer | Mw: 350000 | | | |
| | Polymerizable unsaturated group-containing monomer | ARONIX M-402 | Unsaturated group equivalent: 99 | | | |
| | | ARONIX M-305 | Unsaturated group equivalent: 99 | | | |
| | | ARONIX M-315 | Unsaturated group equivalent: 141 | | | 100 |

TABLE 3-continued

| | | | | | |
|---|---|---|---|---|---|
| Bonding | Pressing pressure [MPa] | | — | 0.5 | 0.5 |
| | Peel strength before curing [N/25 mm] | | 0.381 | | 0.012 |
| | Peel strength after curing [N/25 mm] | | — | | Not measurable (2.1N or more) |
| Antiglare hard coat layer | Appearance | Appearance after bonding | — | ○ | ○ |
| | | Appearance after peeling | — | X | X Film is not peelable. |
| | Rz$_{JIS}$ | | 0.52 | 0.61 | — |
| | Concavo-convex shape transfer rate | | — | 119.6 | |
| | Haze value | | 17.12 | 2.89 | |
| | Total light transmittance | | 91.1 | 90.1 | |
| | Sm | | 17 | 89 | |
| | Image clarity transmission | | 407 | 55 | |
| | Pencil hardness | | H | 4H | |
| | Scratch resistance | | X | ○ | |
| | Glare property | | ○ | X | |
| | Antiglare property | | ○ | Δ | |

It was confirmed that all of the antiglare hard coat layers formed in Examples were high in concavo-convex shape transfer rate and good in antiglare performance. These antiglare hard coat layers were further confirmed to be high in hardness and had high sum total value (%) of transmitted image definition.

Comparative Example 1 is an example in which the weight-average molecular weight of the polymerizable unsaturated group-containing polymer contained in the hard coating composition exceeds the range of claim 1. In this example, the peel strength (peel strength before curing) of the surface contact part of the concavo-convex shape surface of the mold substrate and the uncured hard coat layer surface was small, so that the concavo-convex shaped was not able to be transferred satisfactorily.

Comparative Example 2 is an example in which neither polymerizable unsaturated group-containing oligomer nor polymer is contained in the hard coating composition. In this example, the peel strength (peel strength before curing) of the surface contact part of the concavo-convex shape surface of the mold substrate and the uncured hard coat layer surface was small and the coating film was extruded out of an edge and become concavo-convex in thickness, so that the concavo-convex shaped was not able to be transferred satisfactorily.

Comparative Example 3 is an example in which the pressing pressure applied at the time of surface contact is less than 0.001 MPa. In this example, voids were generated between the mold substrate and the antiglare hard coat layer, and the concavo-convex shape was not confirmed to be transferred in the void portions, and the concavo-convex shape was not able to be transferred satisfactorily.

Comparative Example 4 is an example in which no surface contact step using a mold substrate is performed. In this example, a hard coat layer having no concavo-convex shape was formed.

Comparative Example 5 is an example formed without using any mold substrate, wherein the concavo-convex shape-forming coating composition 1 to be used for forming the mold substrate was used instead of the hard coating composition. In this example, the hardness of the hard coat layer was lower than 3H.

Comparative Example 6 is an example in which the mold substrate was brought into surface contact with an uncured hard coat layer, and then the mold substrate was peeled off without being irradiated with ultraviolet rays, and the ultraviolet rays were applied after the peeling. In this example, there was a separation phenomenon that a part of the antiglare hard coating layer adhered to the film when the mold substrate was peeled off, and the concavo-convex shape was not able to be transferred well.

Comparative Example 7 is an example in which neither polymerizable unsaturated group-containing oligomer nor polymer was contained in the hard coating composition, wherein a polymerizable unsaturated group-containing monomer having a high viscosity was used. In this example, the mold substrate was not able to be peeled after UV irradiation, and the mold substrate peel strength after the UV irradiation was not able to be measured.

INDUSTRIAL APPLICABILITY

According to the formation method of the present invention, it is possible to form an antiglare hard coat layer having a surface concavo-convex shape that exhibits a good antiglare performance and being superior in scratch resistance. The antiglare hard coat layer formed according to the present invention can be suitably provided, for example, in a high detail display.

The invention claimed is:

1. A method for forming an antiglare hard coat layer having a concavo-convex shape on a surface, on at least one surface of a transparent support substrate, comprising:
   a mold substrate production step of producing a mold substrate having a concavo-convex shape on a surface thereof;
   an application step of applying a hard coating composition to one surface of the transparent support substrate, thereby forming an uncured hard coat layer;
   a surface contact step of bringing both the substrates into surface contact with each other in a direction in which the concavo-convex shape surface of the mold substrate and a surface of the uncured hard coat layer face each other;
   a curing step of applying active energy rays, thereby curing the uncured hard coat layer; and
   a peeling step of peeling the mold substrate from the cured hard coat layer,
   wherein
   the hard coating composition contains a polymerizable unsaturated group-containing oligomer or polymer having a weight-average molecular weight in a range of 1000 to 200000, a peel strength of a surface contact part of the concavo-convex shape surface of the mold substrate and the uncured hard coat layer surface is in a range of 0.01 to 2 N/25 mm, a peel strength of the surface contact part of the concavo-convex shape surface of the mold substrate and the hard coat layer after the application of the active energy rays is in a range of 0.005 to 1.5 N/25 mm, a pressing pressure in the surface contact step of the concavo-convex shape surface of the mold substrate and the uncured hard coat layer surface is 0.001 to 5 MPa, and a concavo-convex shape transfer rate achieved when the pressing pressure is in the above range is 75 to 100%.

2. The method for forming an antiglare hard coat layer according to claim 1, wherein the concavo-convex shape of the surface of the mold substrate is a concavo-convex shape formed by applying a concavo-convex shape-forming coating composition containing a first component and a second component, and then phase-separating the first component and the second component.

3. The method for forming an antiglare hard coat layer according to claim 1, wherein the hard coating composition contains the polymerizable unsaturated group-containing oligomer or polymer having the weight-average molecular weight in the range of 1000 to 200000, and a polymerizable unsaturated group-containing monomer having a polymerizable unsaturated group equivalent of 90 to 500 g/eq, wherein an amount of the polymerizable unsaturated group-containing oligomer or polymer is 15 to 85 parts by mass per 100 parts by mass of a solid content of a layer-forming resin component contained in the hard coating composition, and an amount of the polymerizable unsaturated group-containing monomer is 85 to 15 parts by mass.

4. The method for forming an antiglare hard coat layer according to claim 1, wherein the polymerizable unsaturated group contained in the polymerizable unsaturated group-containing polymer is one or more selected from the group consisting of an acryloyl group and a methacryloyl group.

5. The method for forming an antiglare hard coat layer according to claim 1, wherein a hardness of the antiglare hard coat layer is a pencil hardness of 2H or higher.

6. The method for forming an antiglare hard coat layer according to claim 1, wherein the antiglare hard coat layer having the concavo-convex shape on the surface thereof has a surface concavo-convex shape having a ten-point average roughness $Rz_{JIS}$ of 0.2 to 1.0 μm, and an average length RSm of a roughness curve element of 5 to 100 μm.

7. The method for forming an antiglare hard coat layer according to claim 1, wherein the hard coating composition further contains light transmissive fine particles having an average particle diameter of 0.5 to 10 μm, and a refractive index (Rf1) of the light transmissive fine particles and a refractive index (Rf2) of a layer-forming resin component contained in the hard coating composition satisfy a relationship:

$$0.01 \leq \leq |Rf1 - Rf2| \leq 0.23.$$

8. The method for forming an antiglare hard coat layer according to claim 1, wherein the antiglare hard coat layer having the concavo-convex shape on the surface thereof has a surface concavo-convex shape having a sum total value (%) of transmitted image definitions (%) for optical combs with five widths of 0.125 mm, 0.25 mm, 0.5 mm, 1.0 mm and 2.0 mm is in a range of 300 to 480.

9. The method for forming an antiglare hard coat layer according to claim 1, further comprising, after the peeling step, a step of forming one or more functional layers selected from the group consisting of a high refractive index layer, a low refractive index layer and an antifouling layer on the concavo-convex shape surface of the obtained antiglare hard coat layer.

10. The method for forming an antiglare hard coat layer according to claim 1, further comprising a decorative layer forming step of forming a decorative layer on the other surface of the transparent support substrate.

11. A method for producing a display having an antiglare hard coat layer, comprising conducting the method of claim 1 to produce the antiglare hard coat layer, and a step of placing the antiglare hard coat layer on a surface of the display.

12. The method for producing a display having an antiglare hard coat layer according to claim 11, wherein the display is a touch panel display.

* * * * *